United States Patent
He et al.

(10) Patent No.: US 10,819,610 B2
(45) Date of Patent: *Oct. 27, 2020

(54) METHOD FOR ESTIMATING TRAFFIC RATE BETWEEN VIRTUAL MACHINE PAIR, AND RELATED DEVICE

(71) Applicant: Huawei Technologies Co., Ltd., Shenzhen (CN)

(72) Inventors: Jiaying He, Shenzhen (CN); Lili Liu, Hangzhou (CN); Fan Yu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/413,115

(22) Filed: May 15, 2019

(65) Prior Publication Data

US 2019/0268253 A1 Aug. 29, 2019

Related U.S. Application Data

(63) Continuation of application No. 14/843,201, filed on Sep. 2, 2015, now Pat. No. 10,333,814, which is a
(Continued)

(30) Foreign Application Priority Data

Jun. 30, 2014 (CN) .......................... 2014 1 0307341

(51) Int. Cl.
*G06F 15/173* (2006.01)
*H04L 12/26* (2006.01)
(Continued)

(52) U.S. Cl.
CPC .......... *H04L 43/0894* (2013.01); *H04L 29/08* (2013.01); *H04L 41/142* (2013.01); *H04W 24/08* (2013.01)

(58) Field of Classification Search
None
See application file for complete search history.

(56) References Cited

U.S. PATENT DOCUMENTS 7,085,231 B1 * 8/2006 Cahn ..................... H04L 41/142
370/232
7,515,538 B2 * 4/2009 Gefflaut .................. H04L 1/002
370/232

(Continued)

FOREIGN PATENT DOCUMENTS

| CN | 102457517 A | 5/2012 |
| CN | 102929715 A | 2/2013 |

(Continued)

OTHER PUBLICATIONS

Machine Translation and Abstract of Chinese Publication No. CN103838520, Jun. 4, 2014, 52 pages.
(Continued)

*Primary Examiner* — Phyllis A Book
(74) *Attorney, Agent, or Firm* — Conley Rose, P.C.

(57) ABSTRACT

An apparatus and a method for estimating a traffic rate between a virtual machine pair includes, when a rate of traffic sent by a virtual machine vm-x1 to a virtual machine vm-y1 is estimated, obtaining at least rates of sending traffic by N21 virtual machines deployed in N2 physical hosts and including the virtual machine vm-x1, rates of traffic sent by N1 switching devices to N4 switching devices, rates of receiving traffic of N31 virtual machines deployed in N3 physical hosts and including the virtual machine vm-y1, and rates of outgoing traffic of the N4 switching devices.

20 Claims, 6 Drawing Sheets

Related U.S. Application Data continuation of application No. PCT/CN2014/095507, filed on Dec. 30, 2014.

(51) Int. Cl.
*H04L 29/08* (2006.01)
*H04L 12/24* (2006.01)
*H04W 24/08* (2009.01)

(56) References Cited

U.S. PATENT DOCUMENTS

| | | | |
|---|---|---|---|
| 8,761,036 B2 | 6/2014 | Fulton et al. | |
| 2005/0195840 A1* | 9/2005 | Krapp | H04L 47/2475 370/401 |
| 2010/0027420 A1 | 2/2010 | Smith | |
| 2011/0225277 A1* | 9/2011 | Freimuth | G06F 9/45558 709/223 |
| 2011/0282986 A1* | 11/2011 | Phaal | G06F 9/5088 709/224 |
| 2011/0307715 A1 | 12/2011 | Diab | |
| 2012/0102190 A1 | 4/2012 | Durham et al. | |
| 2012/0284398 A1 | 11/2012 | Durham et al. | |
| 2013/0003538 A1* | 1/2013 | Greenberg | H04L 47/623 370/230 |
| 2013/0212244 A1 | 8/2013 | Koponen et al. | |
| 2013/0290955 A1* | 10/2013 | Turner | H04L 41/12 718/1 |
| 2014/0301197 A1 | 10/2014 | Birke et al. | |
| 2016/0173338 A1 | 6/2016 | Wolting | |

FOREIGN PATENT DOCUMENTS

| | | |
|---|---|---|
| CN | 103036721 A | 4/2013 |
| CN | 103152200 A | 6/2013 |
| CN | 103838520 A | 6/2014 |
| CN | 104243231 A | 12/2014 |
| EP | 2629490 A1 | 8/2013 |
| JP | 2013126062 A | 6/2013 |

OTHER PUBLICATIONS

Partial English Translation and Abstract of Chinese Patent Application No. CN104243231, Aug. 28, 2015, 5 pages.

Foreign Communication From a Counterpart Application, Chinese Application No. 201410307341.3, Chinese Office Action dated Apr. 10, 2017, 5 pages.

Foreign Communication From a Counterpart Application, European Application No. 14883531.7, Extended European Search Report dated May 3, 2016, 7 pages.

Foreign Communication From a Counterpart Application, PCT Application No. PCT/CN2014/095507, International Search Report dated Feb. 17, 2015, 7 pages.

Foreign Communication From a Counterpart Application, PCT Application No. PCT/CN2014/095507, Written Opinion dated Feb. 17, 2015, 6 pages.

* cited by examiner

Obtain a traffic parameter set, where a virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 switching devices including a switching device sw-x1 and a switching device sw-x2 are connected to N4 switching devices; N2 physical hosts including the physical host pm-x are lower-layer nodes of the switching device sw-x1; N3 physical hosts including the physical host pm-y are lower-layer nodes of the remaining switching devices of the N1 switching devices except the switching device sw-x1, where The N4 switching devices are parent switching nodes of the N1 switching devices; the traffic parameter set includes: rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices ⟶ 101

↓

Estimate, based on the traffic parameter set, a rate of traffic sent by the virtual machine vm-x1 to the virtual machine vm-y1 ⟶ 102

FIG. 1

Obtain a traffic parameter set, where a virtual machine pair includes a virtual machine vm-x1 and a virtual machine vm-y1, where the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts; the N1 is an integer greater than 1, and the N2 is a positive integer, where the traffic parameter set includes: rates of sending traffic of M21 virtual machines deployed in the physical host pm-x and including the virtual machine vm-x1, rates of receiving traffic of M31 virtual machines deployed in rest Physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices ⟶ 201

↓

Estimate, based on the traffic parameter set, a rate of traffic sent by the virtual machine vm-x1 to the virtual machine vm-y1 ⟶ 202

FIG. 2

METHOD FOR ESTIMATING TRAFFIC RATE BETWEEN VIRTUAL MACHINE PAIR, AND RELATED DEVICE

CROSS-REFERENCE TO RELATED APPLICATIONS

This application is a continuation of U.S. patent application Ser. No. 14/843,201, filed on Sep. 2, 2015, which is a continuation of International Application No. PCT/CN2014/095507, filed on Dec. 30, 2014, which claims priority to Chinese Patent Application No. 201410307341.3, filed on Jun. 30, 2014. All of the aforementioned patent applications are hereby incorporated by reference in their entireties.

TECHNICAL FIELD

The present disclosure relates to the field of network technologies, and in particular to a method for estimating a traffic rate between a virtual machine pair, and a related device.

BACKGROUND

Cloud computing is already permeated into the field of telecommunications, and is widely applied. The cloud computing may provide a service to a user based on a telecommunications device platform by using a virtual machine. In some application scenarios, a quantity of users of the cloud computing are large in scale, deployment of some services may relate to multiple virtual machines, and execution of some services may need to depend on communication between multiple virtual machines.

Communication between virtual machines on a same physical host does not occupy any network bandwidth, while communication between virtual machines on different physical hosts occupies network bandwidth. If two virtual machines communicate with each other frequently, the two virtual machines are deployed on two physical hosts with long communication paths, which not only occupies a large quantity of network bandwidth resources, but also may increase a service delay.

Therefore, it becomes very significant to accurately monitor a traffic rate between virtual machines. For example, by accurately monitoring a traffic rate between virtual machines, a virtual machine pair communicating frequently may be found, and this virtual machine pair is scheduled onto a same physical host or physical hosts with short communication paths, which helps to reduce occupation on network bandwidth resources, and helps to reduce a service delay.

However, no effective solution for accurately estimating a traffic rate between virtual machines has been put forward.

SUMMARY

Embodiments of the present disclosure provide a method for estimating a traffic rate between a virtual machine pair, and a related device, so as to attempt to accurately estimate a traffic rate between a virtual machine pair.

According to a first aspect, there is a method for estimating a traffic rate between a virtual machine pair, where the virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 switching devices including a switching device sw-x1 and a switching device sw-x2 are connected to N4 switching devices; N2 physical hosts including the physical host pm-x are lower-layer nodes of the switching device sw-x1; and N3 physical hosts including the physical host pm-y are lower-layer nodes of the remaining switching devices of the N1 switching devices except the switching device sw-x1, where the N4 switching devices are parent nodes of the N1 switching devices, the N1 is an integer greater than 1, and the N2 and the N3 are positive integers, and the method includes obtaining a traffic parameter set, where the traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices, where the outgoing traffic of the N4 switching devices do not include traffic sent by the N4 switching devices to the N1 switching devices, and the N4, the N21 and the N31 are positive integers, and estimating, based on the traffic parameter set, a rate of traffic sent by the virtual machine vm-x1 to the virtual machine vm-y1.

With reference to the first aspect, in a first possible implementation manner of the first aspect, the estimating, based on the traffic parameter set, a rate of traffic sent by the virtual machine vm-x1 to the virtual machine vm-y1 includes estimating, based on the traffic parameter set and by using the following formula, the rate of traffic sent by the virtual machine vm-x1 to the virtual machine vm-y1, where $$T_{vm-x1 \to vm-y1} = \sum_{sw-xk \in Ln1} \left( \frac{T^{in}_{vm-y1}}{Q^{in}_{N31}} \times \left( T^{out}_{vm-x1} - \frac{T^{out}_{vm-x1}}{Q^{out}_{N21}} \times \frac{T^{out-(sw-xk)}_{sw-x1}}{Q^{out-(sw-xk)}_{N1}} \times T^{out}_{sw-xk} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $Q_{N21}^{out}$ indicates a sum of rates of sending traffic of the N21 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, and the $Q_{N1}^{out-(sw-xk)}$ indicates a sum of rates of traffic sent by the N1 switching devices to the switching device sw-xk, where the $T_{sw-xk}^{out}$ indicates a rate of outgoing traffic of the switching device sw-xk, the Ln1 is a switching device set including the N4 switching devices, and the switching device sw-xk belongs to the Ln1. With reference to the first aspect, in a second possible implementation manner of the first aspect, the traffic parameter set further includes a corrected traffic parameter $K_{vm-x1}$ corresponding to the virtual machine vm-x1, where the $K_{vm-x1}$ is equal to $Q_{vm-x1-(pm-x)}$ or is obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

With reference to the second possible implementation manner of the first aspect, in a third possible implementation manner of the first aspect, the method further includes estimating, based on the following formula, a rate $T_{vm-x1 \to vm-i}$ of traffic sent by the virtual machine vm-x1 to any virtual machine vm-i of the N211 virtual machines except the virtual machine vm-x1, where $$T_{vm-x1 \to vm-i} =$$

$$\left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times$$

$$\left( T_{vm-i}^{in} - \left( \frac{T_{vm-i}^{in}}{Q_{N211}^{in}} \times T_{pm-x}^{in} \right) \right),$$

where the $T_{vm-x1 \to vm-i}$ indicates a rate of traffic sent by the virtual machine vm-x1 to the virtual machine vm-i of the N211 virtual machines, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{N211}^{out}$ indicates a sum of rates of sending traffic of the N211 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{N211}^{in}$ indicates a sum of rates of receiving traffic of the N211 virtual machines, the $T_{pm-x}^{out}$ indicates a rate of traffic sent by the physical host pm-x to a parent node of the physical host pm-x, the $T_{pm-x}^{in}$ indicates a rate of traffic received by the physical host pm-x from a parent node of the physical host pm-x, and the virtual machine vm-i is any virtual machine of the N211 virtual machines except the virtual machine vm-x1.

With reference to the second possible implementation manner of the first aspect or the third possible implementation manner of the first aspect, in a fourth possible implementation manner of the first aspect, the $K_{vm-x1}$ is equal to a sum of the $Q_{vm-x1-(pm-x)}$ and $Q_{vm-x1-(sw-x3)}$, or the $K_{vm-x1}$ is obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts, and the switching device sw-x3 is a lower-layer node of the switching device sw-x1, where the N212 is a positive integer greater than 1, and the N2121 is a positive integer, where $T_{vm-x1 \to vm-j} =$ $$\frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right) \text{ or}$$

$$T_{vm-x1 \to vm-j} = \frac{T_{vm-j}^{in}}{Q_{N2121}^{in}} \times$$

$$\left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right),$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the deployed N2121 virtual machines, where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, and the virtual machine vm-j is any virtual machine deployed in the physical host pm-xj, where the outgoing traffic of the switching device sw-x3 does not include traffic sent by the switching device sw-x3 to the N212 physical hosts.

With reference to the second possible implementation manner of the first aspect, the third possible implementation manner of the first aspect or the fourth possible implementation manner of the first aspect, in a fifth possible implementation manner of the first aspect, the estimating, based on the traffic parameter set, a traffic rate from the virtual machine vm-x to the virtual machine vm-y includes estimating, based on the traffic parameter set and by using the following formula, the rate of traffic sent by the virtual machine vm-x1 to the virtual machine vm-y1, $$T_{vm-x1 \to vm-y1} =$$

$$\sum_{sw-xk \in Ln1} \left( \frac{T_{vm-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

According to a second aspect, there is a method for estimating a traffic rate between a virtual machine pair, where the virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts; the N1 is an integer greater than 1, and the N2 is a positive integer, and the method includes obtaining a traffic parameter set, where the traffic parameter set includes rates of sending traffic of M21 virtual machines deployed in the physical host pm-x and including the virtual machine vm-x1, rates of receiving traffic of M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices, where the outgoing traffic of the N5 switching devices do not include traffic sent by the N5 switching devices to the N1 physical hosts, where the N21, the N5, and the N31 are positive integers, and estimating, based on the traffic parameter set, a rate of traffic sent by the virtual machine vm-x1 to the virtual machine vm-y1.

With reference to the second aspect, in a first possible implementation manner of the second aspect, the estimating, based on the traffic parameter set, a rate of traffic sent by the virtual machine vm-x1 to the virtual machine vm-y1 includes estimating, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

With reference to the second aspect, in a second possible implementation manner of the second aspect, the estimating, based on the traffic parameter set, a rate of traffic sent by the virtual machine vm-x1 to the virtual machine vm-y1 includes estimating, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \left( T_{vm-x1}^{out} - Q_{vm-x1-(pm-x)} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2, where the $Q_{vm-x1-(pm-x)}$ is a sum of rates of traffic sent by the virtual machine vm-x1 to virtual machines of the M21 virtual machines except the virtual machine vm-x1.

With reference to the second possible implementation manner of the second aspect, in a third possible implementation manner of the second aspect, estimating, based on the following formula, a rate $T_{vm-x1 \to vm-i}$ of traffic sent by the virtual machine vm-x1 to any virtual machine vm-i of the M21 virtual machines except the virtual machine vm-x1, where $$T_{vm-x1 \to vm-i} = \left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right),$$

the $T_{vm-x1 \to vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-x1}^{in}$ indicates a rate of receiving traffic of the virtual machine vm-i; the $T_{vm-i}^{in}$ indicates a rate of receiving traffic of the virtual machine vm-i; the $Q_{M21}^{in}$ indicates a sum of rates of receiving traffic of the M21 virtual machines, the $T_{pm-x}^{out}$ indicates rates of traffic sent by the physical host pm-x to the N5 switching devices, the $T_{pm-x}^{out}$ indicates rates of traffic received by the physical host pm-x from the N5 switching devices, and the virtual machine vm-i is any virtual machine of the M21 virtual machines except the virtual machine vm-x1.

According to a third aspect, there is an apparatus for estimating a traffic rate between a virtual machine pair, where the virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 switching devices including a switching device sw-x1 and a switching device sw-x2 are connected to N4 switching devices; N2 physical hosts including the physical host pm-x are lower-layer nodes of the switching device sw-x1; and N3 physical hosts including the physical host pm-y are lower-layer nodes of the remaining switching devices of the N1 switching devices except the switching device sw-x1, where the N4 switching devices are parent nodes of the N1 switching devices, the N1 is an integer greater than 1, and the N2 and the N3 are positive integers, and the apparatus includes an obtaining unit configured to obtain a traffic parameter set, where the traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices, where the outgoing traffic of the N4 switching devices do not include traffic sent by the N4 switching devices to the N1 switching devices, and the N4, the N21 and the N31 are positive integers, and an estimating unit configured to estimate, based on the traffic parameter set, a rate of traffic sent by the virtual machine vm-x1 to the virtual machine vm-y1.

With reference to the third aspect, in a first possible implementation manner of the third aspect, the estimating unit is configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln1} \left( \frac{T_{vm-y1}^{in}}{Q_{N31}^{in}} \times \left( T_{vm-x1}^{out} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $Q_{N21}^{out}$ indicates a sum of rates of sending traffic of the N21 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, and the $Q_{N1}^{out-(sw-xk)}$ indicates a sum of rates of traffic sent by the N1 switching devices to the switching device sw-xk, where the $T_{sw-xk}^{out}$ indicates a rate of outgoing traffic of the switching device sw-xk, the Ln1 is a switching device set including the N4 switching devices, and the switching device sw-xk belongs to the Ln1.

With reference to the third aspect, in a second possible implementation manner of the third aspect, the traffic parameter set further includes a corrected traffic parameter $K_{vm-x1}$ corresponding to the virtual machine vm-x1, where the $K_{vm-x1}$ is equal to $Q_{vm-x1-(pm-x)}$ or is obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

With reference to the second possible implementation manner of the third aspect, in a third possible implementation manner of the third aspect, the estimating unit is further configured to estimate, based on the following formula, a rate $T_{vm-x1 \to vm-i}$ of traffic sent by the virtual machine vm-x1 to any virtual machine vm-i of the N211 virtual machines except the virtual machine vm-x1, where $$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times \left( T_{vm-i}^{in} - \left( \frac{T_{vm-i}^{in}}{Q_{N211}^{in}} \times T_{pm-x}^{in} \right) \right),$$

where the $T_{vm-x1 \to vm-i}$ indicates a rate of traffic sent by the virtual machine vm-x1 to the virtual machine vm-i of the N211 virtual machines, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{N211}^{out}$ indicates a sum of rates of sending traffic of the N211 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{N211}^{in}$ indicates a sum of rates of receiving traffic of the N211 virtual machines, the $T_{pm-x}^{out}$ indicates a rate of traffic sent by the physical host pm-x to a parent node of the physical host pm-x, the $T_{pm-x}^{in}$ indicates a rate of traffic received by the physical host pm-x from a parent node of the physical host pm-x, and the virtual machine vm-i is any virtual machine of the N211 virtual machines except the virtual machine vm-x1.

With reference to the second possible implementation manner of the third aspect or the third possible implementation manner of the third aspect, in a fourth possible implementation manner of the third aspect, the $K_{vm-x1}$ is equal to a sum of the $Q_{vm-x1-(pm-x)}$ and $Q_{vm-x1-(sw-x3)}$, or the $K_{vm-x1}$ is obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts, and the switching device sw-x3 is a lower-layer node of the switching device sw-x1, where the N212 is a positive integer greater than 1, and the N2121 is a positive integer, where $$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right) \text{ or } T_{vm-x1 \to vm-j} = \frac{T_{vm-j}^{in}}{Q_{N2121}^{in}} \times \left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right),$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the deployed N2121 virtual machines, where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, and the virtual machine vm-j is any virtual machine deployed in the physical host pm-xj, where the outgoing traffic of the switching device sw-x3 does not include traffic sent by the switching device sw-x3 to the N212 physical hosts.

With reference to the second possible implementation manner of the third aspect, the third possible implementation manner of the third aspect or the fourth possible implementation manner of the third aspect, in a fifth possible implementation manner of the third aspect, the estimating unit is configured to estimate, based on the traffic parameter set and by using the following formula, the rate of traffic sent by the virtual machine vm-x1 to the virtual machine vm-y1, $$T_{vm-x1 \to vm-y1} =$$

$$\sum_{sw-xk \in Ln1} \left( \frac{T_{vin-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

According to a fourth aspect, there is an apparatus for estimating a traffic rate between a virtual machine pair, where the virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts; the N1 is an integer greater than 1, and the N2 is a positive integer, and the apparatus includes an obtaining unit configured to obtain a traffic parameter set, where the traffic parameter set includes rates of sending traffic of M21 virtual machines deployed in the physical host pm-x and including the virtual machine vm-x1, rates of receiving traffic of M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices, where the outgoing traffic of the N5 switching devices do not include traffic sent by the N5 switching devices to the N1 physical hosts, where the N21, the N5, and the N31 are positive integers, and an estimating unit, estimating, based on the traffic parameter set, a rate of traffic sent by the virtual machine vm-x1 to the virtual machine vm-y1.

With reference to the fourth aspect, in a first possible implementation manner of the fourth aspect, the estimating unit is configured to estimate, based on the traffic parameter set and by using the following formula, the rate of traffic sent by the virtual machine vm-x1 to the virtual machine vm-y1, $$T_{vm-x1 \to vm-y1} =$$

$$\sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

With reference to the fourth aspect, in a second possible implementation manner of the fourth aspect, the estimating unit is configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \right.$$

$$\left. \left( T_{vm-x1}^{out} - Q_{vm-x1-(pm-x)} - \frac{T_{vm-x1}^{out}}{Q_{M21}^{out}} \times \frac{T_{pm-x}^{out(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M1}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2, where the $Q_{vm-x1-(pm-x)}$ is a sum of rates of traffic sent by the virtual machine vm-x1 to virtual machines of the M21 virtual machines except the virtual machine vm-x1.

With reference to the second possible implementation manner of the fourth aspect, in a third possible implementation manner of the fourth aspect, the estimating unit is further configured to estimate, based on the following formula, a rate $T_{vm-x1 \to vm-i}$ of traffic sent by the virtual machine vm-x1 to any virtual machine vm-i of the M21 virtual machines except the virtual machine vm-x1, where $$T_{vm-x1 \to vm-i} =$$

$$\left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right),$$

the $T_{vm-x1 \to vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{M21}^{in}$ indicates a sum of rates of receiving traffic of the M21 virtual machines, the $T_{pm-x}^{out}$ indicates rates of traffic sent by the physical host pm-x to the N5 switching devices, the $T_{pm-x}^{in}$ indicates rates of traffic received by the physical host pm-x from the N5 switching devices, and the virtual machine vm-i is any virtual machine of the M21 virtual machines except the virtual machine vm-x1.

It can be seen that, in the technical solutions of some embodiments of the present disclosure, when a rate of traffic sent by a virtual machine vm-x1 to the virtual machine vm-y1 is estimated, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device of the physical host to which the virtual machine vm-x1 and the virtual machine vm-y1 belong, thereby facilitating accurate estimation of a traffic rate between a virtual machine pair.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 1 is a schematic flowchart of a method for estimating a traffic rate between a virtual machine pair according to an embodiment of the present disclosure.

FIG. 2 is a schematic flowchart of another method for estimating a traffic rate between a virtual machine pair according to an embodiment of the present disclosure.

DESCRIPTION OF EMBODIMENTS

Figure 3:
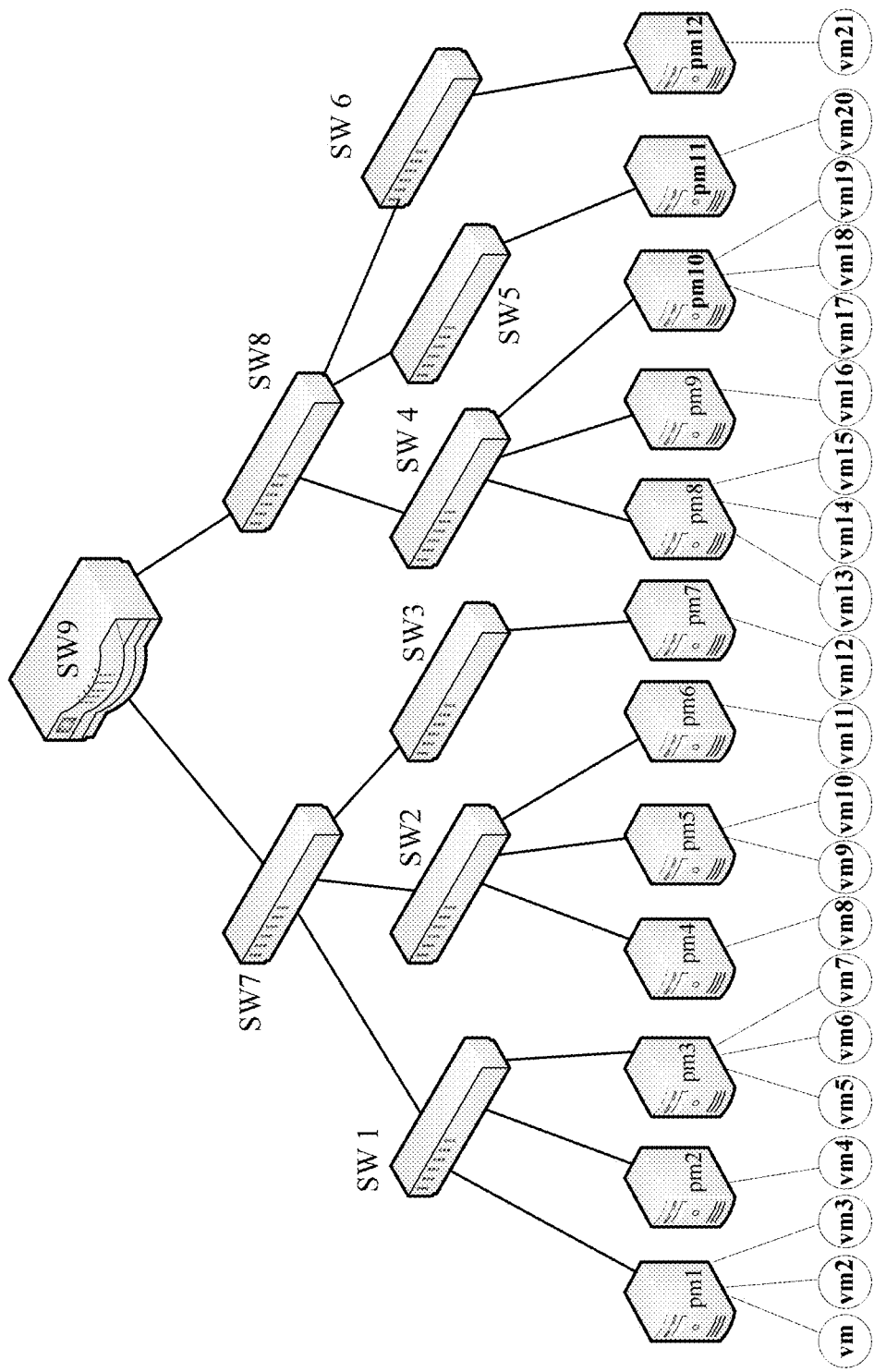
FIG. 3 is a schematic diagram of a topology of a tree network according to an embodiment of the present disclosure.

Embodiments of the present disclosure provide a method for estimating a traffic rate between a virtual machine pair, and a related device, so as to attempt to accurately estimate a traffic rate between a virtual machine pair.

To make a person skilled in the art understand the technical solutions in the present disclosure better, the following clearly describes the technical solutions in the embodiments of the present disclosure With reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The following provides detailed description separately.

In the specification, claims, and accompanying drawings of the present disclosure, the terms "first", "second", "third", "fourth", and so on (if existent) are intended to distinguish between different objects but do not necessarily indicate a specific sequence. In addition, terms "include" and "have" and any of their variations are intended to cover nonexclusive inclusion. For example, a process, method, system, product, or device that includes a series of steps or units is limited to the listed steps or units, but optionally may further include another step or unit that is not listed or is inherent to the process, method, product, or device, or optionally may further include another step or unit that is inherent to the process, method, product, or device.

For ease of understanding the embodiments of the present disclosure, several key elements imported in the description of the embodiments of the present disclosure are first introduced herein.

Virtual machine (VM) one or more virtual physical hosts may be simulated on a physical host by using virtual machine software, and these virtual machines work just like real physical hosts; an operating system and an application program may be installed on a virtual machine, and the virtual machine may further access network resources. For an application program running in a virtual machine, the virtual machine works just as the virtual machine is in a real physical host.

Hardware layer indicates a hardware platform on which a virtualization environment is run. The hardware layer may include various hardware, for example, a hardware layer of a physical host may include a central processing unit (CPU) and a memory, and may further include high-speed/low-speed input/output (I/O) devices such as a network adapter and a memory, and certainly the hardware layer may further include other devices having a specific processing function.

Host: it serves as a management layer, and is configured to implement management and allocation of hardware resources; presents a virtual hardware platform to a virtual machine; and implements scheduling and isolation of the virtual machine. A Host may be a virtual machine monitor (VMM). Furthermore, sometimes VMM and one privileged virtual machine (Domain 0) cooperate, and the two are combined to form Host. The virtual hardware platform provides various hardware resources to each virtual machine run on the virtual hardware platform, such as, provides a virtual CPU, memory, a virtual magnetic disk, a virtual network adapter and the like. The virtual magnetic disk may be corresponding to a file or a logic block device of Host. A virtual machine is run on the virtual hardware platform prepared by Host for the virtual machine, and one or more virtual machines are run on Host.

In an embodiment of a method for estimating a traffic rate between a virtual machine pair of the present disclosure, the virtual machine pair includes a virtual machine vm-x1 and a virtual machine vm-y1, where the virtual machine vm-x1 is deployed in a physical host pm-x, and the virtual machine vm-y1 is deployed in a physical host pm-y; N1 switching devices including a switching device sw-x1 and a switching device sw-x2 are connected to N4 switching devices; N2 physical hosts including the physical host pm-x are lower-layer nodes of the switching device sw-x1, and N3 physical hosts including the physical host pm-y are lower-layer nodes of the remaining switching devices of the N1 switching devices except the switching device sw-x1, where the N4 switching devices are parent nodes of the N1 switching devices, the N1 is an integer greater than 1, and the N2 and the N3 are positive integers; and the method includes obtaining a traffic parameter set, where the traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices, where the outgoing traffic of the N4 switching devices do not include traffic sent by the N4 switching devices to the N1 switching devices, and the N4, the N21 and the N31 are positive integers; and estimating, based on the traffic parameter set, a rate of traffic sent by the virtual machine vm-x1 to the virtual machine vm-y1.

Referring to FIG. 1, FIG. 1 is a schematic flowchart of a method for estimating a traffic rate between a virtual machine pair according to an embodiment of the present disclosure. As shown in FIG. 1, a method for estimating a traffic rate between a virtual machine pair provided in an embodiment of the present disclosure may include the following content 101: Obtain a traffic parameter set.

The virtual machine pair includes a virtual machine vm-x1 and a virtual machine vm-y1, the virtual machine vm-x1 is deployed in a physical host pm-x, and the virtual machine vm-y1 is deployed in a physical host pm-y. N1 switching devices including a switching device sw-x1 and a switching device sw-x2 are connected to N4 switching devices. N2 physical hosts including the physical host pm-x are lower-layer nodes of the switching device sw-x1 (that is, a layer difference between the N2 physical hosts and a root node is greater than a layer difference between the switching device sw-x1 and the root node, for example, the N2 physical hosts may be child nodes, grandchild nodes or lower-layer nodes of the switching device sw-x1). N3 physical hosts including the physical host pm-y are lower-layer nodes of the remaining switching devices (the remaining switching devices include the switching device sw-x2) of the N1 switching devices except the switching device sw-x1 (that is, a layer difference between the N3 physical hosts and the root node is greater than a layer difference between the switching device sw-x2 and the root node, for example, the N3 physical hosts may be child nodes, grandchild nodes or lower-layer nodes of the remaining switching devices of the N1 switching devices except the switching device sw-x1). The N4 switching devices are parent nodes of the N1 switching devices, the N1 is an integer greater than 1, and the N2 and the N3 are positive integers.

An intersection set between the N2 physical hosts and the N3 physical hosts may be an empty set or a non-empty set. The N2 physical hosts are, for example, some or all lower-layer nodes of the switching device sw-x1. The N3 physical hosts are, for example, some or all lower-layer nodes of the remaining switching devices of the N1 switching devices except the switching device sw-x1.

The traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The outgoing traffic of the N4 switching devices do not include traffic sent by the N4 switching devices to the N1 switching devices, and the N4, the N21 and the N31 are positive integers.

The switching device mentioned in this embodiment of the present disclosure may be a switch or router. The method of this embodiment of the present disclosure may be applied to a tree network.

The N31 virtual machines are, for example, some or all virtual machines deployed in the N3 physical hosts. The N21 virtual machines are, for example, some or all virtual machines deployed in the N2 physical hosts. The N1 switching devices may be some or all child nodes of the N4 switching devices. The N4 switching devices may be some or all parent nodes of the N1 switching devices.

102: Estimate, based on the traffic parameter set, a rate of traffic sent by the virtual machine vm-x1 to the virtual machine vm-y1.

The virtual machine vm-x1 is any virtual machine of the N21 virtual machines, and the virtual machine vm-y1 may be any virtual machine that is of the N31 virtual machines and deployed in the physical host pm-y.

It can be seen that, in the solution of this embodiment, when a rate of traffic sent by the virtual machine vm-x1 to the virtual machine vm-y1 is estimated, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

A device executing step 101 and step 102 may be a management node, where the management node may be communicatively connected to the N1 switching devices, the N4 switching devices, the N2 physical hosts and/or the N3 physical hosts, the management node may be a root node of a tree network to which the N4 switching devices belong or the management node may also be a lower-layer node of the root node of the tree network to which the N4 switching devices belong (where the management node may even be one of the N1 switching devices, the N4 switching devices, the N2 physical hosts and the N3 physical hosts, for example, the management node may be a physical host or a switching device), and certainly, the management node may also be a device outside the tree network to which the N4 switching devices belong. The management node may, for example, send traffic rate reporting requests to nodes of the tree network to which the N4 switching devices such as the N1 switching devices, the N4 switching devices, the N2 physical hosts and the N3 physical hosts belong, so as to online obtain a related traffic rate that the node of the tree network to which the N4 switching devices such as the N1 switching devices, the N4 switching devices, the N2 physical hosts and the N3 physical hosts belong requests to feed back based on the traffic rate reporting request (for example, the management node may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node to respond to the traffic rate reporting request, similarly, the management node may send a traffic rate reporting request to the switching device sw-x1, the switching device sw-x1 may, for example, feed back a related traffic rate, such as a rate of traffic sent by the switching device sw-x1 to a parent node, or a rate of receiving traffic by the switching device sw-x1 from a parent node, to the management node to respond to the traffic rate reporting request, and the rest can be deduced by analogy). Furthermore, the management node may also be not communicatively connected to a node in the tree network to which the N4 switching devices such as the N1 switching devices, the N4 switching devices, the N2 physical hosts and/or the N3 physical hosts belong, and therefore the management node may also offline obtain a related traffic rate of a node of the tree network to which the N4 switching devices such as the N1 switching devices, the N4 switching devices, the N2 physical hosts and the N3 physical hosts belong.

Specific manners of estimating, based on the traffic parameter set, a rate of traffic sent by the virtual machine vm-x1 to the virtual machine vm-y1 may be various, and some possible implementation manners are described as follows For example, the estimating, based on the traffic parameter set, a rate of traffic sent by the virtual machine vm-x1 to the virtual machine vm-y1 may include estimating, based on the traffic parameter set and by using the following formula, the rate of traffic sent by the virtual machine vm-x1 to the virtual machine vm-y1.

$$T_{vm-x1 \to vm-y1} = \sum_{sw-xk \in Ln1} \left( \frac{T^{in}_{vm-y1}}{Q^{in}_{N31}} \times \left( T^{out}_{vm-x1} - \frac{T^{out}_{vm-x1}}{Q^{out}_{N21}} \times \frac{T^{out-(sw-xk)}_{sw-x1}}{Q^{out-(sw-xk)}_{N1}} \times T^{out}_{sw-xk} \right) \right),$$

where the $T_{vm-x1 \to vm-y1}$ indicates the rate of traffic sent by the virtual machine vm-x1 to the virtual machine vm-y1, the $T^{in}_{vm-y1}$ indicates a rate of receiving traffic of the virtual machine vm-y1, the $Q^{in}_{N31}$ indicates a sum of rates of receiving traffic of the N31 virtual machines, the $Q^{out}_{N21}$ indicates a sum of rates of sending traffic of the N21 virtual machines, the $T^{out}_{vm-x1}$ rate of traffic sent by the switching device sw-x1 to a switching device sw-xk, the $Q^{out-(sw-xk)}_{N1}$ indicates a sum of rates of traffic sent by the N1 switching devices to the switching device sw-xk, the $T^{out}_{sw-xk}$ indicates a rate of outgoing traffic of the switching device sw-xk, the Ln1 is a switching device set including the N4 switching devices, and the switching device sw-xk belongs to the Ln1. Based on the foregoing formula, it helps to accurately estimate a rate of traffic sent by the virtual machine vm-x1 to the virtual machine vm-y1.

Optionally, the traffic parameter set further includes a corrected traffic parameter $K_{vm-x1}$ corresponding to the virtual machine vm-x1. The $K_{vm-x1}$ may be equal to $Q_{vm-x1-(pm-x)}$ or may be obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

For example, a rate $T_{vm-x1 \to vm-i}$ of traffic sent by the virtual machine vm-x1 to any virtual machine vm-i of the N211 virtual machines except the virtual machine vm-x1 may be estimated based on the following formula, where $$T_{vm-x1 \to vm-i} = \left( \frac{T^{out}_{vm-x1} - \left( \frac{T^{out}_{vm-x1}}{Q^{out}_{N211}} \times T^{out}_{pm-x} \right)}{\left( T^{out}_{vm-x1} \left( \frac{T^{out}_{vm-x1}}{Q^{out}_{N211}} \times T^{out}_{pm-x} \right) \right) + \left( T^{out}_{vm-i} - \left( \frac{T^{out}_{vm-i}}{Q^{out}_{N211}} \times T^{out}_{pm-x} \right) \right)} \right) \times$$

$$\left( T^{in}_{vm-i} - \left( \frac{T^{in}_{vm-i}}{Q^{in}_{N211}} \times T^{in}_{pm-x} \right) \right),$$

the $T_{vm-x1 \to vm-i}$ indicates a rate of traffic sent by the virtual machine vm-x1 to the virtual machine vm-i of the N211 virtual machines, the $T^{out}_{vm-i}$ indicates a rate of sending traffic of the virtual machine vm-i, the $T^{out}_{vm-x1}$ indicates a rate of sending traffic of the virtual machine vm-x1, and the $Q^{out}_{N211}$ indicates a sum of rates of sending traffic of the N211 virtual machines, where the $T^{in}_{vm-i}$ indicates a rate of receiving traffic of the virtual machine vm-i; the $T^{in}_{vm-i}$ indicates a rate of receiving traffic of the virtual machine vm-i; the $Q^{in}_{N211}$ indicates a sum of rates of receiving traffic of the N211 virtual machines, the $T^{out}_{pm-x}$ indicates a rate of traffic sent by the physical host pm-x to a parent node of the physical host pm-x, the $T^{in}_{pm-x}$ indicates a rate of traffic received by the physical host pm-x from a parent node of the physical host pm-x, and the virtual machine vm-i is any virtual machine of the N211 virtual machines except the virtual machine vm-x1.

Optionally, the $K_{vm-x1}$ may be equal to a sum of the $Q_{vm-x1-(pm-x)}$ and $Q_{vm-x1-(sw-x3)}$, or the $K_{vm-x1}$ may be obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts (for example, the N212 physical hosts may be some or all child nodes of the switching device sw-x3), where and the switching device sw-x3 is a lower-layer node of the switching device sw-x1, where the N212 is a positive integer greater than 1, and the N2121 is a positive integer.

$$T_{vm-x1 \to vm-j} =$$

$$\frac{T^{in}_{vm-j}}{Q^{in}_{N2121}} \times \left( T^{out}_{vm-x1} - \left( \frac{T^{out}_{vm-x1}}{Q^{out}_{N211}} \times \frac{T^{out-(sw-x3)}_{pm-x}}{Q^{out-(sw-x3)}_{N212}} \times T^{out}_{sw-x3} \right) \right) \text{ or } T_{vm-x1 \to vm-j} =$$

$$\frac{T_{vm-j}^{in}}{Q_{N2121}^{in}} \times \left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right)$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the N2121 virtual machines (the N2121 virtual machines may be some or all virtual machines deployed on physical hosts of the N212 physical hosts except the physical host pm-x), where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, where the virtual machine vm-j may be any virtual machine deployed in the physical host pm-xj, and the outgoing traffic of the switching device sw-x3 does not include traffic sent by the switching device sw-x3 to the N212 physical hosts, for example, the outgoing traffic of the switching device sw-x3 is a traffic sent by the switching device sw-x3 to an upper-layer node of the switching device sw-x3.

Also optionally, the estimating, based on the traffic parameter set, a rate of sending traffic of the virtual machine vm-x to the virtual machine vm-y may include estimating, based on the traffic parameter set and by using the following formula, the rate of traffic sent by the virtual machine vm-x1 to the virtual machine vm-y1, $$T_{vm-x1 \to vm-y1} = \sum_{sw-xk \in Ln1} \left( \frac{T_{vm-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1. Based on the foregoing formula, it helps to accurately estimate a rate of traffic sent by the virtual machine vm-x1 to the virtual machine vm-y1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, after a traffic rate between virtual machines is estimated, a pair of virtual machines with a large traffic rate may be migrated into a same physical host, or migrated into a physical host with a short path. Furthermore, a pair of virtual machines with a small traffic rate may be migrated into different physical hosts, for example, may be migrated into physical hosts with long paths. Certainly other policy control may be further performed based on the estimated traffic rate between the virtual machines.

In another embodiment of a method for estimating a traffic rate between a virtual machine pair of the present disclosure, the virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts; the N1 is an integer greater than 1, and the N2 is a positive integer; the method includes obtaining a traffic parameter set, where the traffic parameter set includes rates of sending traffic of M21 virtual machines deployed in the physical host pm-x and including the virtual machine vm-x1, rates of receiving traffic of M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices, and the outgoing traffic of the N5 switching devices do not include traffic sent by the N5 switching devices to the N1 physical hosts, where the N21, the N1, the N5, and the N31 are positive integers, and the N1 is greater than 1; and estimating, based on the traffic parameter set, a rate of traffic sent by the virtual machine vm-x1 to the virtual machine vm-y1.

Referring to FIG. 2, FIG. 2 is a schematic flowchart of another method for estimating a traffic rate between a virtual machine pair according to another embodiment of the present disclosure. As shown in FIG. 1, another method for estimating a traffic rate between a virtual machine pair provided in another embodiment of the present disclosure may include the following content 201: Obtain a traffic parameter set.

The virtual machine pair includes a virtual machine vm-x1 and a virtual machine vm-y1, where the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts (for example, the N5 switching devices are some or all parent nodes of the N1 physical hosts, for example, the N1 physical hosts are some or all child nodes of the N5 switching devices). The N1 is an integer greater than 1, and the N2 is a positive integer.

The traffic parameter set includes rates of sending traffic of M21 virtual machines deployed in the physical host pm-x and including the virtual machine vm-x1 (for example, the M21 virtual machines are some or all virtual machines deployed in the physical host pm-x), rates of receiving traffic of M31 virtual machines deployed in the remaining physical hosts (the rest physical hosts include pm-y) of the N1 physical hosts except the physical host pm-x and including the virtual machine vm-y1 (for example, the M31 virtual machines are some or all virtual machines deployed in the remaining physical hosts of the N1 physical hosts except the physical host pm-x), rates of traffic sent by the N1 physical hosts including the physical host pm-y and the physical host pm-x to the N5 switching devices, and rates of outgoing traffic of the N5 switching devices, and the outgoing traffic of the N5 switching devices do not include traffic sent by the N5 switching devices to the N1 physical hosts. The N21, the N5, and the N31 are positive integers.

202: Estimate, based on the traffic parameter set, a rate of traffic sent by the virtual machine vm-x1 to the virtual machine vm-y1.

The physical host pm-x and the physical host pm-y may be any two physical hosts of the N1 physical hosts. The virtual machine vm-x1 is any virtual machine deployed in the physical host pm-x, and the virtual machine vm-y1 may be any virtual machine deployed in the physical host pm-y.

It can be seen that, in the solution of this embodiment, when a rate of traffic sent by the virtual machine vm-x1 to the virtual machine vm-y1 is estimated, reference is made to at least rates of sending traffic of the M21 virtual machines deployed in the physical host pm-x and including the virtual machine vm-x1, rates of receiving traffic of the M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices. The N4 switching devices are parent nodes of the N1 physical hosts, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

A device executing step 201 and step 202 may be a management node, where the management node may be communicatively connected to the N1 physical hosts and/or the N5 switching devices, the management node may be a root node of a tree network to which the N5 switching devices belong or the management node may also be a lower-layer node of the root node of the tree network to which the N5 switching devices belong (where the management node may even be one of the N5 switching devices and the N1 physical hosts, for example, the management node may be a physical host or a switching device), and certainly, the management node may also be a device outside the tree network to which the N5 switching devices belong. The management node may, for example, send traffic rate reporting requests to nodes of the tree network to which the N5 switching devices such as the N5 switching devices and the N1 physical hosts belong, so as to online obtain a related traffic rate that the node of the tree network to which the N5 switching devices such as the N5 switching devices and the N1 physical hosts belong requests to feed back based on the traffic rate reporting request (for example, the management node may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node to respond to the traffic rate reporting request, similarly, the management node may send a traffic rate reporting request to a switching device of the N5 switching devices, the switching device may, for example, feed back a related traffic rate, such as a rate of traffic sent by the switching device to a parent node, to the management node to respond to the traffic rate reporting request, and the rest can be deduced by analogy). Furthermore, the management node may also be not communicatively connected to a node in the tree network to which the N5 switching devices such as the N1 physical hosts and the N5 switching devices belong, and therefore the management node may also offline obtain a related traffic rate of the node of the tree network to which the N5 switching devices such as the N1 physical hosts and the N5 switching devices belong.

Specific manners of estimating, based on the traffic parameter set, a rate of traffic sent by the virtual machine vm-x1 to the virtual machine vm-y1 may be various, and some possible implementation manners are described below to perform description.

For example, the estimating, based on the traffic parameter set, a rate of traffic sent by the virtual machine vm-x1 to the virtual machine vm-y1 may include estimating, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T^{in}_{vm-y1}}{Q^{in}_{M31}} \times \left( T^{out}_{vm-x1} - \frac{T^{out}_{vm-x1}}{Q^{out}_{M21}} \times \frac{T^{out-(sw-xk)}_{pm-x}}{Q^{out-(sw-xk)}_{N1}} \times T^{out}_{sw-xk} \right) \right);$$

where the $T_{vm-x1 \to vm-y1}$ indicates the rate of traffic sent by the virtual machine vm-x1 to the virtual machine vm-y1, the $T^{in}_{vm-y1}$ indicates a rate of receiving traffic of the virtual machine vm-y1, the $Q^{in}_{M31}$ indicates a sum of rates of receiving traffic of the M31 virtual machines, the $Q^{out}_{M21}$ indicates a sum of rates of sending traffic of the M21 virtual machines, the $T^{out-(sw-xk)}_{pm-x}$ indicates a rate of traffic sent by the physical host pm-x to a switching device sw-xk, the $Q^{out-(sw-xk)}_{N1}$ indicates a sum of rates of traffic sent by the N1 physical hosts to the switching device sw-xk, the $T^{out}_{sw-xk}$ indicates a rate of outgoing traffic of the switching device sw-xk, the Ln2 is a switching device set including the N3 switching devices, and the switching device sw-xk belongs to the Ln2. Based on the foregoing formula, it helps to accurately estimate a rate of traffic sent by the virtual machine vm-x1 to the virtual machine vm-y1.

For another example, the estimating, based on the traffic parameter set, a rate of traffic sent by the virtual machine vm-x1 to the virtual machine vm-y1 includes estimating, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T^{in}_{vm-y1}}{Q^{in}_{M31}} \times \left( T^{out}_{vm-x1} - Q_{vm-x1-(pm-x)} - \frac{T^{out}_{vm-x1}}{Q^{out}_{M21}} \times \frac{T^{out-(sw-xk)}_{pm-x}}{Q^{out-(sw-xk)}_{N1}} \times T^{out}_{sw-xk} \right) \right);$$

where the $T_{vm-x1 \rightarrow vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2. Based on the foregoing formula, it helps to accurately estimate a rate of traffic sent by the virtual machine vm-x1 to the virtual machine vm-y1.

The $Q_{vm-x1-(pm-x)}$ is a sum of rates of traffic sent by the virtual machine vm-x1 to virtual machines of the M21 virtual machines except the virtual machine vm-x1.

Optionally, a rate $T_{vm-x1 \rightarrow vm-i}$ of traffic sent by the virtual machine vm-x1 to any virtual machine vm-i of the M21 virtual machines except the virtual machine vm-x1 may be estimated based on the following formula, where $$T_{vm-x1 \rightarrow vm-i} = \left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times \left( T_{vm-i}^{in} - \left( \frac{T_{vm-i}^{in}}{Q_{M21}^{in}} \times T_{pm-x}^{in} \right) \right),$$

where the $T_{vm-x1 \rightarrow vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{M21}^{in}$ indicates a sum of rates of receiving traffic of the M21 virtual machines, the $T_{pm-x}^{in}$ indicates rates of traffic sent by the physical host pm-x to the N5 switching devices, the $T_{pm-x}^{in}$ indicates rates of traffic received by the physical host pm-x from the N5 switching devices, and the virtual machine vm-i is any virtual machine of the M21 virtual machines except the virtual machine vm-x1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, after a traffic rate between virtual machines is estimated, a pair of virtual machines with a large traffic rate may be migrated into a same physical host, or migrated into a physical host with a short path. Furthermore, a pair of virtual machines with a small traffic rate may be migrated into different physical hosts, for example, may be migrated into physical hosts with long paths. Certainly other policy control may be further performed based on the estimated traffic rate between the virtual machines.

For ease of better understanding and implementing the foregoing solutions of the embodiments of the present disclosure, some specific application scenarios are described below to perform further description.

Referring to FIG. 3, FIG. 3 is a schematic diagram of an architecture of a tree network according to an embodiment of the present disclosure. Description is performed below by using a solution of an embodiment under the architecture shown in FIG. 3 as an example.

FIG. 3 shows that, a switching device sw9 is a root node, and a switching device sw7 and a switching device sw8 are child nodes of the switching device sw9. A switching device sw1, a switching device sw2 and a switching device sw3 are child nodes of the switching device sw7. A switching device sw4, a switching device sw5 and a switching device sw6 are child nodes of the switching device sw8.

A physical host pm7 is a child node of the switching device sw3. A physical host pm1, a physical host pm2 and a physical host pm3 are child nodes of the switching device sw1. A physical host pm5, a physical host pm6 and a physical host pm4 are child nodes of the switching device sw2. A physical host pm8, a physical host pm9 and a physical host pm10 are child nodes of the switching device sw4. A physical host pm11 is a child node of the switching device sw5. A physical host pm12 is a child node of the switching device sw6.

A virtual machine vm1, a virtual machine vm2 and a virtual machine vm3 are deployed in the physical host pm1. A virtual machine vm4 is deployed in the physical host pm2. A virtual machine vm5, a virtual machine vm6 and a virtual machine vm7 are deployed in the physical host pm3. A virtual machine vm8 is deployed in the physical host pm4. A virtual machine vm9 and a virtual machine vm10 are deployed in the physical host pm5. A virtual machine vm11 is deployed in the physical host pm6. A virtual machine vm12 is deployed in the physical host pm7. A virtual machine vm13, a virtual machine vm14 and a virtual machine vm15 are deployed in the physical host pm8. A virtual machine vm16 is deployed in the physical host pm9. A virtual machine vm17, a virtual machine vm18 and a virtual machine vm19 are deployed in the physical host pm10. A virtual machine vm20 is deployed in the physical host pm11. A virtual machine vm21 is deployed in the physical host pm12.

Estimation on a traffic rate between virtual machines deployed in a same physical host is first introduced. Estimation on a traffic between virtual machines deployed in the physical host pm1 is used as an example.

For the physical host pm1, communication between the virtual machine vm1, the virtual machine vm2 and the virtual machine vm3 in the physical host pm1 may be considered as internal communication, and communication between each of the virtual machine vm1, the virtual machine vm2 and the virtual machine vm3 and a virtual machine on another physical host or another device may be considered as external communication.

When no particular description is made, $T_{vmp1 \rightarrow vmp2}$ indicates an estimated rate of traffic sent by a virtual machine vmp1 to a virtual machine vmp2, and $T_{vm-p1 \rightarrow vm-p2}$ indicates an estimated rate of traffic sent by a virtual machine vm-p1 to a virtual machine vm-p2. $T_{vmp}^{out}$ indicates a measured rate of sending traffic of a virtual machine vmp, $T_{vmp}^{in}$ indicates a measured the virtual machine vmp a rate of a receiving traffic, $T_{vm-p}^{out}$ indicates a measured rate of sending traffic of a virtual machine vm-p, and $T_{vm\text{-}p}^{in}$ indicates a measured rate of receiving traffic of the virtual machine vm-p.

A sum of rates of traffic sent by the virtual machine vm1, the virtual machine vm2 and the virtual machine vm3 to a device outside the physical host pm1 is equal to a rate $T_{pm1}^{out\text{-}sw1}$ of sending traffic by the physical host pm1 to the switching device sw1. A sum of rates of traffic received by the virtual machine vm1, the virtual machine vm2 and the virtual machine vm3 from a device outside the physical host pm1 is equal to a rate $T_{pm1}^{in\text{-}sw1}$ of traffic received by the physical host pm1 from the switching device sw1.

That is, $T_{pm1}^{out\text{-}sw1} = T_{vm1 \to outer} + T_{vm2 \to outer} + T_{vm3 \to outer}$.

That is, $T_{pm1}^{in\text{-}sw1} = T_{outer \to vm1} + T_{outer \to vm2} + T_{outer \to vm3}$.

A manner of estimating a rate $T_{vm1 \to outer}$ of sending traffic by the virtual machine vm1 to a device (the switching device sw1 in the drawing) outside the physical host pm1 is as follows $$T_{vm1 \to outer} = \frac{T_{vm1}^{out}}{T_{vm1}^{out} + T_{vm2}^{out} + T_{vm3}^{out}} \times T_{pm1}^{out\text{-}sw1}.$$

A manner of estimating a rate $T_{vm2 \to outer}$ of sending traffic by the virtual machine vm2 to a device (the switching device sw1 in the drawing) outside the physical host pm1 is as follows $$T_{vm2 \to outer} = \frac{T_{vm2}^{out}}{T_{vm1}^{out} + T_{vm2}^{out} + T_{vm3}^{out}} \times T_{pm1}^{out\text{-}sw1}.$$

A manner of estimating a rate $T_{vm3 \to outer}$ of sending traffic by the virtual machine vm3 to a device (the switching device sw1 in the drawing) outside the physical host pm1 is as follows $$T_{vm3 \to outer} = \frac{T_{vm3}^{out}}{T_{vm1}^{out} + T_{vm2}^{out} + T_{vm3}^{out}} \times T_{pm1}^{out\text{-}sw1}.$$

A manner of estimating a rate $T_{outer \to vm1}$ of receiving traffic by the virtual machine vm1 from a device outside the physical host pm1 (received from the switching device sw1 in the drawing) is as follows $$T_{outer \to vm1} = \frac{T_{vm1}^{in}}{T_{vm1}^{in} + T_{vm2}^{in} + T_{vm3}^{in}} \times T_{pm1}^{in\text{-}sw1}.$$

A manner of estimating a rate $T_{outer \to vm2}$ of receiving traffic by the virtual machine vm2 from a device outside the physical host pm1 (received from the switching device sw1 in the drawing) is as follows $$T_{outer \to vm2} = \frac{T_{vm2}^{in}}{T_{vm1}^{in} + T_{vm2}^{in} + T_{vm3}^{in}} \times T_{pm1}^{in\text{-}sw1}.$$

A manner of estimating a rate $T_{outer \to vm3}$ of receiving traffic by the virtual machine vm3 from a device outside the physical host pm1 (received from the switching device sw1 in the drawing) is as follows $$T_{outer \to vm3} = \frac{T_{vm3}^{in}}{T_{vm1}^{in} + T_{vm2}^{in} + T_{vm3}^{in}} \times T_{pm1}^{in\text{-}sw1}, \text{ where}$$

$$T_{vm1 \to vm2}(tmp) = \frac{T_{vm1.internal}^{out}}{T_{vm1.internal}^{out} + T_{vm2.internal}^{out} + T_{vm3.internal}^{out}} \times T_{vm2.internal}^{in}$$

$$T_{vm2 \to vm1}(tmp) = \frac{T_{vm2.internal}^{out}}{T_{vm1.internal}^{out} + T_{vm2.internal}^{out} + T_{vm3.internal}^{out}} \times T_{vm1.internal}^{in}$$

$$T_{vm1 \to vm3}(tmp) = \frac{T_{vm1.internal}^{out}}{T_{vm1.internal}^{out} + T_{vm2.internal}^{out} + T_{vm3.internal}^{out}} \times T_{vm3.internal}^{in}$$

$$T_{vm3 \to vm1}(tmp) = \frac{T_{vm3.internal}^{out}}{T_{vm1.internal}^{out} + T_{vm2.internal}^{out} + T_{vm3.internal}^{out}} \times T_{vm1.internal}^{in}$$

$$T_{vm2 \to vm3}(tmp) = \frac{T_{vm2.internal}^{out}}{T_{vm1.internal}^{out} + T_{vm2.internal}^{out} + T_{vm3.internal}^{out}} \times T_{vm3.internal}^{in}$$

$$T_{vm3 \to vm2}(tmp) = \frac{T_{vm3.internal}^{out}}{T_{vm1.internal}^{out} + T_{vm2.internal}^{out} + T_{vm3.internal}^{out}} \times T_{vm2.internal}^{in}$$

where $T_{vm1.internal}^{out} = T_{vm1}^{out} - T_{vm1 \to outer}$ $T_{vm2.internal}^{out} = T_{vm2}^{out} - T_{vm2 \to outer}$ $T_{vm3.internal}^{out} = T_{vm3}^{out} - T_{vm3 \to outer}$ $T_{vm1.internal}^{out} = T_{vm1}^{in} - T_{outer \to vm1}$ $T_{vm2.internal} = T_{vm2}^{in} - T_{outer \to vm2}$ $T_{vm3.internal}^{in} = T_{vm3}^{in} - T_{outer \to vm3}$, where $T_{vm1 \to vm2} = T_{vm1 \to vm2}(tmp)$, or, $$T_{vm1 \to vm2} = \frac{T_{vm1 \to vm12}(tmp)}{T_{internal}^{out}(tmp)} \times T_{internal}^{out},$$

where $T_{vm2 \to vm1} = T_{vm2 \to vm1}(tmp)$, or, $$T_{vm2 \to vm1} = \frac{T_{vm2 \to vm1}(tmp)}{T_{internal}^{out}(tmp)} \times T_{internal}^{out},$$

where $T_{vm2 \to vm3} = T_{vm2 \to vm3}(tmp)$, or, $$T_{vm2 \to vm3} = \frac{T_{vm2 \to vm3}(tmp)}{T_{internal}^{out}(tmp)} \times T_{internal}^{out},$$

where $T_{vm3 \to vm2} = T_{vm3 \to vm2}(tmp)$, or, $$T_{vm3 \to vm2} = \frac{T_{vm3 \to vm2}(tmp)}{T_{internal}^{out}(tmp)} \times T_{internal}^{out},$$

where $T_{vm1 \to vm3} = T_{vm1 \to vm3}(tmp)$, or, $$T_{vm1 \to vm3} = \frac{T_{vm1 \to vm3}(tmp)}{T_{internal}^{out}(tmp)} \times T_{internal}^{out},$$

where $T_{vm3 \to vm1} = T_{vm3 \to vm1}(tmp)$, or $$T_{vm3 \to vm1} = \frac{T_{vm3 \to vm1}(tmp)}{T_{internal}^{out}(tmp)} \times T_{internal}^{out},$$

where $T_{internal}^{out} = (T_{vm1}^{out} + T_{vm2}^{out} + T_{vm3}^{out}) - T_{pm1}^{out-sw}1$, $T_{internal}^{out}(tmp) = T_{vm1 \to vm3}(tmp) + T_{vm3 \to vm1}(tmp) + T_{vm3 \to vm2}(tmp) + T_{vm2 \to vm3}(tmp) + T_{vm2 \to vm1}(tmp) + T_{vm1 \to vm2}(tmp)$, where $T_{vm1 \to vm2}$ indicates an estimated rate of sending traffic of the virtual machine vm1 to the virtual machine vm2; $T_{vm1 \to vm3}$ indicates an estimated rate of sending traffic of the virtual machine vm1 to the virtual machine vm3; $T_{vm2 \to vm3}$ indicates an estimated rate of sending traffic of the virtual machine vm2 to the virtual machine vm3; $T_{vm2 \to vm1}$ indicates an estimated rate of sending traffic of the virtual machine vm2 to the virtual machine vm1; $T_{vm3 \to vm1}$ indicates an estimated rate of sending traffic of the virtual machine vm3 to the virtual machine vm1.

$T_{vm3 \to vm2}$ indicates an estimated rate of sending traffic of the virtual machine vm3 to the virtual machine vm2. $T_{vm1}^{out}$ indicates traffic sent by the virtual machine vm1, $T_{vm2}^{out}$ indicates traffic sent by the virtual machine vm2, and $T_{vm3}^{out}$ indicates traffic sent by the virtual machine vm3. $T_{vm1}^{in}$ indicates traffic received by the virtual machine vm1; $T_{vm2}^{in}$ indicates traffic received by the virtual machine vm2; $T_{vm3}^{in}$ indicates traffic received by the virtual machine vm3.

It can be understood that, a traffic rate between virtual machines deployed in another same physical host may be estimated and obtained based on the foregoing exemplary manner.

Furthermore, a traffic rate between several child nodes of a same switching device may be further estimated based on a similar manner. For example, a traffic rate between the physical host pm1, the physical host pm2 and the physical host pm3 under the switching device sw1 may be estimated based on a similar manner.

A sum of rates of traffic sent by the physical host pm1, the physical host pm2 and the physical host pm3 to a device outside the switching device sw1 is equal to a rate $T_{sw1}^{out-sw}7$ of sending traffic by the switching device sw1 to the switching device sw7. A sum of rates of traffic received by the physical host pm1, the physical host pm2 and the physical host pm3 from a device outside the switching device sw1 is equal to a rate $T_{sw1}^{in-sw}7$ of receiving traffic by the switching device sw from the switching device sw7.

That is, $T_{sw1}^{out-sw7}7 = T_{pm1 \to outer} + T_{pm2 \to outer} + T_{pm3 \to outer}$
That is, $T_{sw1}^{in-sw7}7 = T_{outer \to pm1} + T_{outer \to pm2} + T_{outer \to pm3}$ A manner of estimating a rate $T_{pm1 \to outer}$ of sending traffic by the physical host pm1 to a device (the switching device sw7 in the drawing) outside the switching device sw1 is as follows $$T_{pm1 \to outer} = \frac{T_{pm1}^{out}}{T_{pm1}^{out} + T_{pm2}^{out} + T_{pm3}^{out}} \times T_{sw1}^{out-sw7}.$$

A manner of estimating a rate $T_{pm2 \to outer}$ of sending traffic by the physical host pm2 to a device (the switching device sw7 in the drawing) outside the switching device sw1 is as follows $$T_{pm2 \to outer} = \frac{T_{pm2}^{out}}{T_{pm1}^{out} + T_{pm2}^{out} + T_{pm3}^{out}} \times T_{sw1}^{out-sw7}.$$

A manner of estimating a rate $T_{pm3 \to outer}$ of sending traffic by the physical host pm3 to a device (the switching device sw7 in the drawing) outside the switching device sw1 is as follows $$T_{pm3 \to outer} = \frac{T_{pm3}^{out}}{T_{pm1}^{out} + T_{pm2}^{out} + T_{pm3}^{out}} \times T_{sw1}^{out-sw7}.$$

A manner of estimating a rate $T_{outer \to pm1}$ of receiving traffic by the physical host pm1 from a device outside the switching device sw1 (received from the switching device sw7 in the drawing) is as follows $$T_{outer \to pm1} = \frac{T_{pm1}^{in}}{T_{pm1}^{in} + T_{pm2}^{in} + T_{pm3}^{in}} \times T_{sw1}^{in-sw7}.$$

A manner of estimating a rate $T_{outer \to pm2}$ of receiving traffic by the physical host pm2 from a device outside the switching device sw1 (received from the switching device sw7 in the drawing) is as follows $$T_{outer \to pm2} = \frac{T_{pm2}^{in}}{T_{pm1}^{in} + T_{pm2}^{in} + T_{pm3}^{in}} \times T_{sw1}^{in-sw7}.$$

A manner of estimating a rate $T_{outer \to pm3}$ of receiving traffic by the physical host pm3 from a device outside the switching device sw1 (received from the switching device sw7 in the drawing) is as follows:

$$T_{outer \to pm3} = \frac{T_{pm3}^{in}}{T_{pm1}^{in} + T_{pm2}^{in} + T_{pm3}^{in}} \times T_{sw1}^{in-sw7}.$$

$$T_{pm1 \to pm2}(tmp) = \frac{T_{pm1.internal}^{out}}{T_{pm1.internal}^{out} + T_{pm2.internal}^{out} + T_{pm3.internal}^{out}} \times T_{pm2.internal}^{in}$$

$$T_{pm2 \to pm1}(tmp) = \frac{T_{pm2.internal}^{out}}{T_{pm1.internal}^{out} + T_{pm2.internal}^{out} + T_{pm3.internal}^{out}} \times T_{pm1.internal}^{in}$$

$$T_{pm1 \to pm3}(tmp) = \frac{T_{pm1.internal}^{out}}{T_{pm1.internal}^{out} + T_{pm2.internal}^{out} + T_{pm3.internal}^{out}} \times T_{pm3.internal}^{in}$$

$$T_{pm3 \to pm1}(tmp) = \frac{T_{pm3.internal}^{out}}{T_{pm1.internal}^{out} + T_{pm2.internal}^{out} + T_{pm3.internal}^{out}} \times T_{pm1.internal}^{in}$$

$$T_{pm2 \to pm3}(tmp) = \frac{T_{pm2.internal}^{out}}{T_{pm1.internal}^{out} + T_{pm2.internal}^{out} + T_{pm3.internal}^{out}} \times T_{pm3.internal}^{in}$$

$$T_{pm3 \to pm2}(tmp) = \frac{T_{pm3.internal}^{out}}{T_{pm1.internal}^{out} + T_{pm2.internal}^{out} + T_{pm3.internal}^{out}} \times T_{pm2.internal}^{in}$$

where $T_{pm1.internal}^{out} = T_{pm1}^{out} - T_{pm1 \to outer}$ $T_{pm2.internal}^{out} = T_{pm2}^{out} - T_{pm2 \to outer}$ $T_{pm3.internal}^{out} = T_{pm3}^{out} - T_{pm3 \to outer}$ $T_{pm1.internal}^{out} = T_{pm1}^{in} - T_{outer \to pm1}$ $T_{pm2.internal}^{in} = T_{pm2}^{in} - T_{outer \to pm2}$ $T_{pm3.internal}^{in} = T_{pm3}^{in} - T_{outer \to pm3}$ where $T_{pm1 \to pm2} = T_{pm1 \to pm2}(tmp)$, or, $$T_{pm1 \to pm2} = \frac{T_{pm1 \to pm2}(tmp)}{T_{internal}^{out}(tmp)} \times T_{internal}^{out},$$

where $T_{pm2 \to pm1} = T_{pm2 \to pm1}(tmp)$ or, $$T_{pm2 \to pm1} = \frac{T_{pm2 \to pm1}(tmp)}{T_{internal}^{out}(tmp)} \times T_{internal}^{out},$$

where $T_{pm2 \to pm3} = T_{pm2 \to pm3}(tmp)$, or, $$T_{pm2 \to pm3} = \frac{T_{pm2 \to pm3}(tmp)}{T_{internal}^{out}(tmp)} \times T_{internal}^{out},$$

where $T_{pm3 \to pm2} = T_{pm3 \to pm2}(tmp)$, or, $$T_{pm3 \to pm2} = \frac{T_{pm3 \to pm2}(tmp)}{T_{internal}^{out}(tmp)} \times T_{internal}^{out},$$

where $T_{pm1 \to pm3} = T_{pm1 \to pm3}(tmp)$ or, $$T_{pm1 \to pm3} = \frac{T_{pm1 \to pm3}(tmp)}{T_{internal}^{out}(tmp)} \times T_{internal}^{out},$$

where $T_{pm3 \to pm1} = T_{pm3 \to pm1} = (tmp)$ or, $$T_{pm3 \to pm1} = \frac{T_{pm3 \to pm1}(tmp)}{T_{internal}^{out}(tmp)} \times T_{internal}^{out},$$

where $T_{internal}^{out} = (T_{pm1}^{out} + T_{pm2}^{out} + T_{pm2 \to pm3}(tmp) + T_{pm2 \to pm1}(tmp) + T_{pm1 \to pm2}(tmp)$, where in the foregoing exemplary formula, $T_{pm1 \to pm2}$ indicates an estimated rate of traffic sent by the physical host pm1 to the physical host pm2; $T_{pm1 \to pm3}$ indicates an estimated rate of traffic sent by the physical host pm1 to the physical host pm3; $T_{pm2 \to pm3}$ indicates an estimated rate of traffic sent by the physical host pm2 to the physical host pm3; $T_{pm2 \to pm1}$ indicates an estimated rate of traffic sent by the physical host pm2 to the physical host pm1, where $T_{pm3 \to pm1}$ indicates an estimated rate of traffic sent by the physical host pm3 to the physical host pm1, where $T_{pm3 \to pm2}$ indicates an estimated rate of traffic sent by the physical host pm3 to the physical host pm2. $T_{pm1}^{out}$ indicates traffic sent by the physical host pm1, $T_{pm2}^{out}$ indicates traffic sent by the physical host pm2, and $T_{pm3}^{out}$ indicates traffic sent by the physical host pm3. $T_{pm1}^{in}$ indicates traffic received by the physical host pm1; $T_{pm2}^{in}$ indicates traffic received by the physical host pm2; $T_{pm3}^{in}$ indicates traffic received by the physical host pm3.

It can be understood that, a traffic rate between child nodes deployed under another same switching device may be estimated and obtained based on the foregoing exemplary manner.

$$T_{vm1 \to outer(sw1)} = \frac{T_{vm1}^{out}}{T_{vm1}^{out} + T_{vm2}^{out} + T_{vm3}^{out}} \times T_{pm1 \to outer}$$

$$T_{vm2 \to outer(sw1)} = \frac{T_{vm2}^{out}}{T_{vm1}^{out} + T_{vm2}^{out} + T_{vm3}^{out}} \times T_{pm1 \to outer}$$

$$T_{vm3 \to outer(sw1)} = \frac{T_{vm3}^{out}}{T_{vm1}^{out} + T_{vm2}^{out} + T_{vm3}^{out}} \times T_{pm1 \to outer}$$

$$T_{vm5 \to outer(sw1)} = \frac{T_{vm5}^{out}}{T_{vm5}^{out} + T_{vm6}^{out} + T_{vm7}^{out}} \times T_{pm3 \to outer}$$

$$T_{vm6 \to outer(sw1)} = \frac{T_{vm6}^{out}}{T_{vm5}^{out} + T_{vm6}^{out} + T_{vm7}^{out}} \times T_{pm3 \to outer}$$

$$T_{vm7 \to outer(sw1)} = \frac{T_{vm7}^{out}}{T_{vm5}^{out} + T_{vm6}^{out} + T_{vm7}^{out}} \times T_{pm3 \to outer}$$

where $$T_{vm1 \to vm5} = \frac{T_{vm5}^{in}}{T_{vm4}^{in} + T_{vm5}^{in} + T_{vm6}^{in} + T_{vm7}^{in}} \times (T_{vm1}^{out} - Q_{vm1-pm1} - T_{vm1 \to outer(sw1)}) \text{ or,}$$

$$T_{vm1 \to vm5} = \frac{T_{vm5}^{in}}{T_{vm5}^{in} + T_{vm4}^{in} + T_{vm6}^{in} + T_{vm7}^{in}} \times (T_{vm1}^{out} - T_{vm1 \to outer(sw1)}),$$

where $$T_{vm1 \to vm4} = \frac{T_{vm4}^{in}}{T_{vm4}^{in} + T_{vm5}^{in} + T_{vm6}^{in} + T_{vm7}^{in}} \times (T_{vm1}^{out} - Q_{vm1-pm1} - T_{vm1 \to outer(sw1)}) \text{ or,}$$

$$T_{vm1 \to vm4} = \frac{T_{vm4}^{in}}{T_{vm5}^{in} + T_{vm4}^{in} + T_{vm6}^{in} + T_{vm7}^{in}} \times (T_{vm1}^{out} - T_{vm1 \to outer(sw1)}),$$

where $$T_{vm1 \to vm6} = \frac{T_{vm6}^{in}}{T_{vm5}^{in} + T_{vm4}^{in} + T_{vm6}^{in} + T_{vm7}^{in}} \times (T_{vm1}^{out} - Q_{vm1-pm1} - T_{vm1 \to outer(sw1)}) \text{ or,}$$

$$T_{vm1 \to vm6} = \frac{T_{vm6}^{in}}{T_{vm5}^{in} + T_{vm4}^{in} + T_{vm6}^{in} + T_{vm7}^{in}} \times (T_{vm1}^{out} - T_{vm1 \to outer(sw1)}),$$

where $$T_{vm1 \to vm7} = \frac{T_{vm7}^{in}}{T_{vm5}^{in} + T_{vm4}^{in} + T_{vm6}^{in} + T_{vm7}^{in}} \times (T_{vm1}^{out} - Q_{vm1-pm1} - T_{vm1 \to outer(sw1)}) \text{ or,}$$

$$T_{vm1 \to vm7} = \frac{T_{vm7}^{in}}{T_{vm5}^{in} + T_{vm4}^{in} + T_{vm6}^{in} + T_{vm7}^{in}} \times (T_{vm1}^{out} - T_{vm1 \to outer(sw1)}),$$

where the $Q_{vm1-pm1}$ is a sum of estimated rates of traffic sent by the virtual machine vm1 to virtual machines deployed in the physical host pm1 except the virtual machine vm1.

$$Q_{vm1-pm1} = T_{vm1 \to vm2} + T_{vm1 \to vm3}$$

where, in the foregoing exemplary formula, $T_{vm1 \to vm5}$ indicates an estimated rate of sending traffic of the virtual machine vm1 to the virtual machine vm5; $T_{vm1 \to vm6}$ indicates an estimated rate of sending traffic of the virtual machine vm1 to the virtual machine vm6; $T_{vm1 \to vm7}$ indicates an estimated rate of sending traffic of the virtual machine vm1 to the virtual machine vm7, and the rest can be deduced by analogy. Likewise, $T_{vm5 \to vm1}$, $T_{vm5 \to vm1}$ and $T_{vm7 \to vm1}$ may be estimated. Likewise, a traffic rate between other virtual machines under the switching device sw1 may be further estimated; likewise, a traffic rate between virtual machines under the switching device sw2 may be further estimated; likewise, a traffic rate between virtual machines under the switching device sw4 may be further estimated; likewise, a traffic rate between virtual machines under the switching device sw6 may be further estimated.

Similarly, traffic between virtual machines deployed in each physical host under SW7 may be further estimated.

Estimation on $T_{vm1 \to vm10}$ and $T_{vm1 \to vm1}$ is used as an example in the following, where the virtual machine vm1 may be considered as an example of the virtual machine vm-x1 in the foregoing embodiment, and the virtual machine vm10 and the virtual machine vm11 may be considered as two examples of the virtual machine vm-y1 in the foregoing embodiment.

$$T_{vm1 \to vm10} = \frac{T^{in}_{vm10}}{T^{in}_{vm8} + T^{in}_{vm9} + T^{in}_{vm10} + T^{in}_{vm11}} \times (T^{out}_{vm1} - T_{vm1 \to outer(sw7)}) \text{ or,}$$

$$T_{vm1 \to vm10} =$$
$$\frac{T^{in}_{vm10}}{T^{in}_{vm8} + T^{in}_{vm9} + T^{in}_{vm10} + T^{in}_{vm11}} \times (T^{out}_{vm1} - Q_{vm1-sw1} - T_{vm1 \to outer(sw7)})$$

$$T_{vm1 \to vm11} = \frac{T^{in}_{vm11}}{T^{in}_{vm8} + T^{in}_{vm9} + T^{in}_{vm10} + T^{in}_{vm11}} \times (T^{out}_{vm1} - T_{vm1 \to outer(sw7)}) \text{ or,}$$

$$T_{vm1 \to vm11} =$$
$$\frac{T^{in}_{vm11}}{T^{in}_{vm8} + T^{in}_{vm9} + T^{in}_{vm10} + T^{in}_{vm11}} \times (T^{out}_{vm1} - Q_{vm1-sw1} - T_{vm1 \to outer(sw7)})$$

where $$T_{vm1 \to outer(sw7)} =$$
$$\frac{T^{out}_{vm1}}{T^{out}_{vm1} + T^{out}_{vm2} + T^{out}_{vm3} + T^{out}_{vm4} + T^{out}_{vm5} + T^{out}_{vm6} + T^{out}_{vm7}} \times T_{vm1 \to outer}$$

where $T_{sw1 \to outer} = \frac{T^{out}_{sw1}}{T^{out}_{sw1} + T^{out}_{sw2} + T^{out}_{sw3}} \times T^{out-sw9}_{sw7}$, where $T^{out-sw9}_{sw7}$ indicates a rate of traffic sent by the switching device sw7 to the switching device sw9, and $T^{out}_{sw1}$ indicates a rate of traffic sent by the switching device sw1 to the switching device sw7; $T^{out}_{sw2}$ indicates a rate of traffic sent by the switching device sw2 to the switching device sw7; $T^{out}_{sw3}$ indicates a rate of traffic sent by the switching device sw3 to the switching device sw7. $Q_{vm1-sw1}$ indicates a sum of estimated traffic sent by the virtual machine vm1 to other virtual machines of the switching device sw1, that is, $Q_{vm1-sw1} = T_{vm1 \to vm2} + T_{vm1 \to vm3} + T_{vm1 \to vm4} + T_{vm1 \to vm5} + T_{vm1 \to vm6} + T_{vm1 \to vm7}$.

It can be understood that, methods for estimating $T_{vm1 \to vm8}$, $T_{vm1 \to vm9}$, and $T_{vm1 \to vm10}$ can be deduced by analogy, and are not described herein again.

Similarly, traffic between virtual machines deployed in each physical host under SW9 may be further estimated.

Estimation on $T_{vm1 \to vm19}$ and $T_{vm1 \to vm20}$u is used as an example in the following, where the virtual machine vm1 may be considered as an example of the virtual machine vm-x1 in the foregoing embodiment, and the virtual machine vm19 and the virtual machine vm20 may be considered as two examples of the virtual machine vm-y1 in the foregoing embodiment.

$$T_{vm1 \to vm19} = \frac{T^{in}_{vm19} \times (T^{out}_{vm1} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}} \text{ or,}$$

$$T_{vm1 \to vm19} = \frac{T^{in}_{vm19} \times (T^{out}_{vm1} - Q_{vm1-sw7} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}}$$

-continued $$T_{vm1 \to vm20} = \frac{T^{in}_{vm20} \times (T^{out}_{vm1} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}} \text{ or,}$$

$$T_{vm1 \to vm20} = \frac{T^{in}_{vm20} \times (T^{out}_{vm1} - Q_{vm1-sw7} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}}$$

where $$T_{vm1 \to outer(sw9)} = \frac{T^{out}_{vm1} \times T_{sw7 \to outer}}{T^{out}_{vm1} + T^{out}_{vm2} + T^{out}_{vm3} + T^{out}_{vm4} + T^{out}_{vm5} + T^{out}_{vm6} + T^{out}_{vm7} + T^{in}_{vm8} + T^{in}_{vm9} + T^{in}_{vm10} + T^{in}_{vm11}},$$

where $T_{sw7 \to outer} = \frac{T^{out}_{sw7}}{T^{out}_{sw7} + T^{out}_{sw8}} \times T^{out}_{sw9}$, where $T^{out}_{sw9}$ indicates a rate of outgoing traffic of the switching device sw9, and the outgoing traffic of the switching device sw9 does not include traffic sent by the switching device sw9 to the switching device sw7 and the switching device sw8. $T^{out}_{sw7}$ indicates a rate of traffic sent by the switching device sw7 to all parent nodes thereof (only the switching device sw9 in FIG. 3); $T^{out}_{sw8}$ indicates a rate of traffic sent by the switching device sw8 to all parent nodes thereof (only the switching device sw9 in FIG. 3). $Q_{vm1-sw7}$ indicates a sum of estimated traffic sent by the virtual machine vm1 to other virtual machines under the switching device sw7, that is, $Q_{vm1-sw7} = T_{vm1 \to vm2} + T_{vm1 \to vm3} + T_{vm1 \to vm4} + T_{vm1 \to vm5} + T_{vm1 \to vm6} + T_{vm1 \to vm7} + T_{vm1 \to vm8} + T_{vm1 \to vm9} + T_{vm1 \to vm10} + T_{vm1 \to vm11}$.

It can be understood that methods for estimating traffic rates of the virtual machine vm1 and other virtual machines under the switching device sw8 may be deduced by analogy, and are not described herein again. Methods for estimating traffic rates of other virtual machines under the switching device sw7 and other virtual machines under the switching device sw8 may be deduced by analogy, and are not described herein again.

Figure 4:
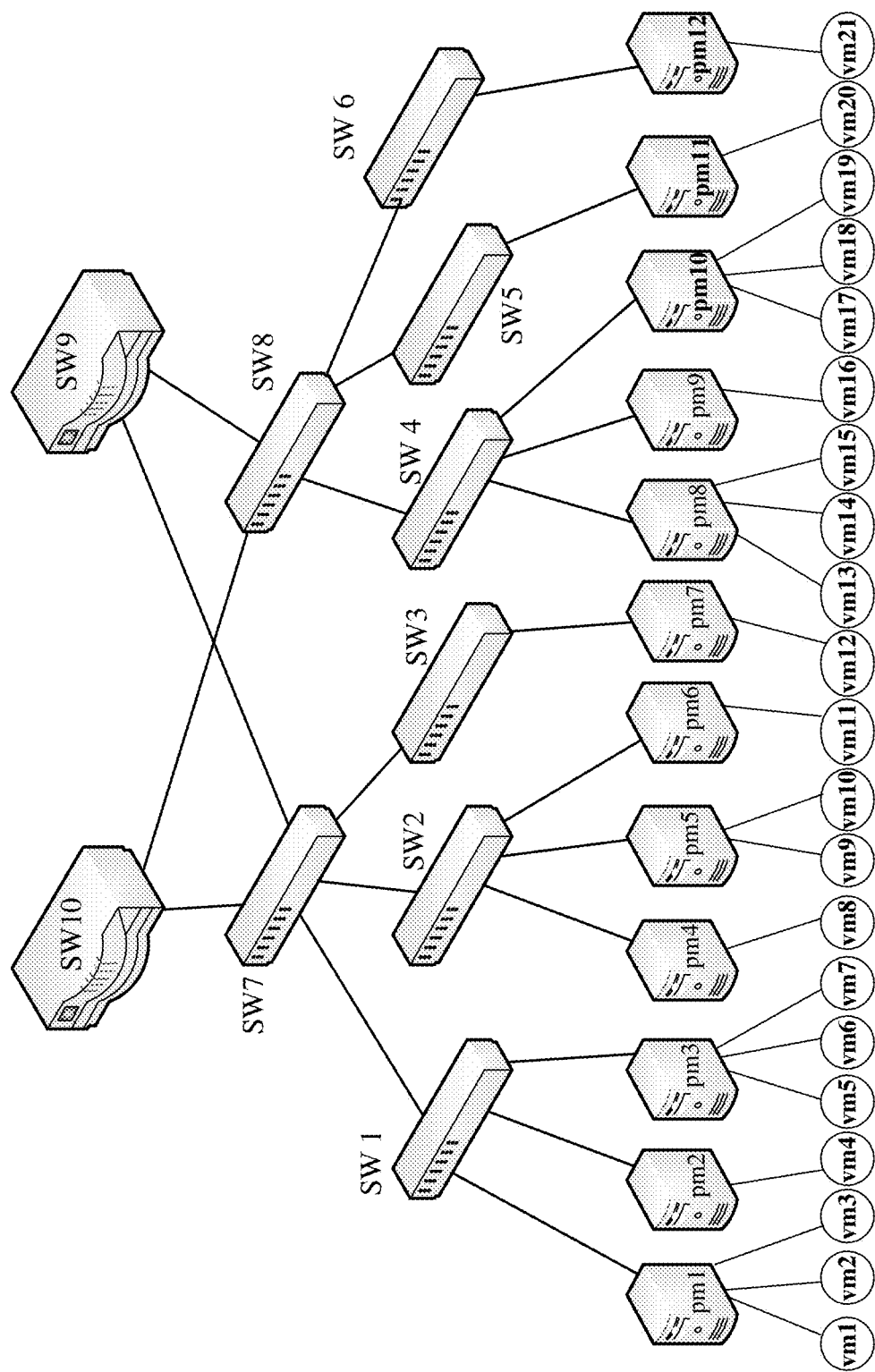
FIG. 4 is a schematic diagram of a topology of another tree network according to an embodiment of the present disclosure.

Referring to FIG. 4, FIG. 4 is a schematic diagram of an architecture of another tree network according to an embodiment of the present disclosure. Description is performed below by using the solution of the embodiment under the architecture shown in FIG. 3 as an example.

Different from the architecture shown in FIG. 3, in the architecture shown in FIG. 4, a switching device sw7 and a switching device sw8 have two parent nodes, that is, a switching device sw9 and a switching device sw10, and because two paths exist between the switching device sw7 and the switching device sw8, that is, sw7→sw9→sw8, and sw7→sw10→sw8, a traffic rate between a virtual machine under the switching device sw7 and a virtual machine under the switching device sw8 may be separately estimated for each path, and then summation is performed to obtain a traffic rate between these two virtual machines.

A manner of estimating a traffic rate between virtual machines under the switching device sw7 is similar to the corresponding estimating manner under the architecture shown in FIG. 3, and a manner of estimating a traffic rate between virtual machines under the switching device sw8 is similar to the corresponding estimating manner under the architecture shown in FIG. 3. A manner of estimating a traffic rate between a virtual machine under the switching device sw7 and a virtual machine under the switching device sw8 is introduced below by using an example.

Estimation on $T_{vm1 \to vm19}$ and $T_{vm1 \to vm20}$ is still used as an example in the following, where the virtual machine vm1 may be considered as an example of the virtual machine vm-x1 in the foregoing embodiment, and the virtual machine vm19 and the virtual machine vm20 may be considered as two examples of the virtual machine vm-y1 in the foregoing embodiment.

$$T_{vm1 \to vm19} =$$

$$\frac{T^{in}_{vm19} \times (T^{out}_{vm1} - T_{vm1 \to outer(sw9)}) + T^{in}_{vm19} \times (T^{out}_{vm1} - T_{vm1 \to outer(sw10)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}} \text{ or,}$$

$$T_{vm1 \to vm19} = \frac{T^{in}_{vm19} \times (2 \times T^{out}_{vm1} - 2 \times Q_{vm1-sw7} - T_{vm1 \to outer(sw10)} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}}$$

$$T_{vm1 \to vm20} =$$

$$\frac{T^{in}_{vm20} \times (T^{out}_{vm1} - T_{vm1 \to outer(sw9)}) + T^{in}_{vm20} \times (T^{out}_{vm1} - T_{vm1 \to outer(sw10)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}} \text{ or,}$$

$$T_{vm1 \to vm20} = \frac{T^{in}_{vm20} \times (2 \times T^{out}_{vm1} - 2 \times Q_{vm1-sw7} - T_{vm1 \to outer(sw10)} - T_{vm1 \to outer(sw9)})}{T^{in}_{vm13} + T^{in}_{vm14} + T^{in}_{vm15} + T^{in}_{vm16} + T^{in}_{vm17} + T^{in}_{vm18} + T^{in}_{vm19} + T^{in}_{vm20} + T^{in}_{vm21}}$$

where $$T_{vm1 \to outer(sw9)} = \frac{T^{out}_{vm1} \times T_{sw7 \to outer(sw9)}}{T^{out}_{vm1} + T^{out}_{vm2} + T^{out}_{vm3} + T^{out}_{vm4} + T^{out}_{vm5} + T^{out}_{vm6} + T^{out}_{vm7} + T^{in}_{vm8} + T^{in}_{vm9} + T^{in}_{vm10} + T^{in}_{vm11}}.$$

where $$T_{vm1 \to outer(sw10)} = \frac{T^{out}_{vm1} \times T_{sw7 \to outer(sw10)}}{T^{out}_{vm1} + T^{out}_{vm2} + T^{out}_{vm3} + T^{out}_{vm4} + T^{out}_{vm5} + T^{out}_{vm6} + T^{out}_{vm7} + T^{in}_{vm8} + T^{in}_{vm9} + T^{in}_{vm10} + T^{in}_{vm11}}.$$

where $T_{sw7 \to outer(sw9)} = \frac{T^{out-sw9}_{sw7}}{T^{out-sw9}_{sw7} + T^{out-sw9}_{sw8}} \times T^{out}_{sw9}.$ where $T_{sw7 \to outer(sw10)} = \frac{T^{out-sw10}_{sw7}}{T^{out-sw10}_{sw7} + T^{out-sw10}_{sw8}} \times T^{out}_{sw10}.$ where $T^{out}_{sw9}$ indicates a rate of outgoing traffic of the switching device sw9, and the outgoing traffic of the switching device sw9 does not include traffic sent by the switching device sw9 to the switching device sw7 and the switching device sw8. $T^{out}_{sw10}$ indicates a rate of outgoing traffic of the switching device sw10, and the outgoing traffic of the switching device sw10 does not include traffic sent by the switching device sw10 to the switching device sw7 and the switching device sw8.

$T^{out-sw9}_{sw7}$ indicates a rate of traffic sent by the switching device sw7 to the switching device sw9; $T^{out-sw9}_{sw8}$ indicates a rate of traffic sent by the switching device sw8 to the switching device sw9; $T^{out-sw10}_{sw7}$ indicates a rate of traffic sent by the switching device sw7 to the switching device sw10; $T^{out-sw10}_{sw8}$ indicates a rate of traffic sent by the switching device sw8 to the switching device sw10, where $Q_{vm1-sw7}$ indicates a sum of estimated traffic sent by the virtual machine vm1 to other virtual machines under the switching device sw7, that is, $Q_{vm1-sw7} = T_{vm1 \to vm2} + T_{vm1 \to vm3} + T_{vm1 \to vm4} + T_{vm1 \to vm5} + T_{vm1 \to vm6} + T_{vm1 \to vm7} + T_{vm1 \to vm8} + T_{vm1 \to vm8} + T_{vm1 \to vm10} + T_{vm1 \to vm11}.$ It can be understood that, methods for estimating traffic rates of the virtual machine vm1 and other virtual machines under the switching device sw8 may be deduced by analogy, and are not described herein again. Methods for estimating traffic rates of other virtual machines under the switching device sw7 and other virtual machines under the switching device sw8 may be deduced by analogy, and are not described herein again.

It can be understood that, the foregoing examples are mainly on the basis of the tree architectures shown in FIG. 3 and FIG. 4, and certainly a traffic rate between virtual machines may also be estimated under other tree architectures based on the foregoing principle.

Further, a maximum traffic rate, a minimum traffic rate, an average traffic rate or the like between a pair of virtual machines may be calculated according to collected traffic based on a Poisson distribution algorithm, so as to perform precise dynamic scheduling, and make full use of network bandwidth resources.

Further, after a traffic rate between virtual machines is estimated, a pair of virtual machines with a large traffic rate may be deployed in a same physical host (for example, if a traffic rate between the virtual machine vm1 and the virtual machine vm19 is large, the virtual machine vm19 may be migrated into the physical host pm1), or deployed in a physical host with a short path. Furthermore, a pair of virtual machines with a small traffic rate may be deployed in different physical hosts (for example, if a traffic rate between the virtual machine vm1 and the virtual machine vm2 is extremely small, the virtual machine vm2 may be migrated into another physical host pm1), for example, deployed in physical hosts with long paths. Certainly other policy control may be further performed based on the estimated traffic rate between the virtual machines.

Figure 5:
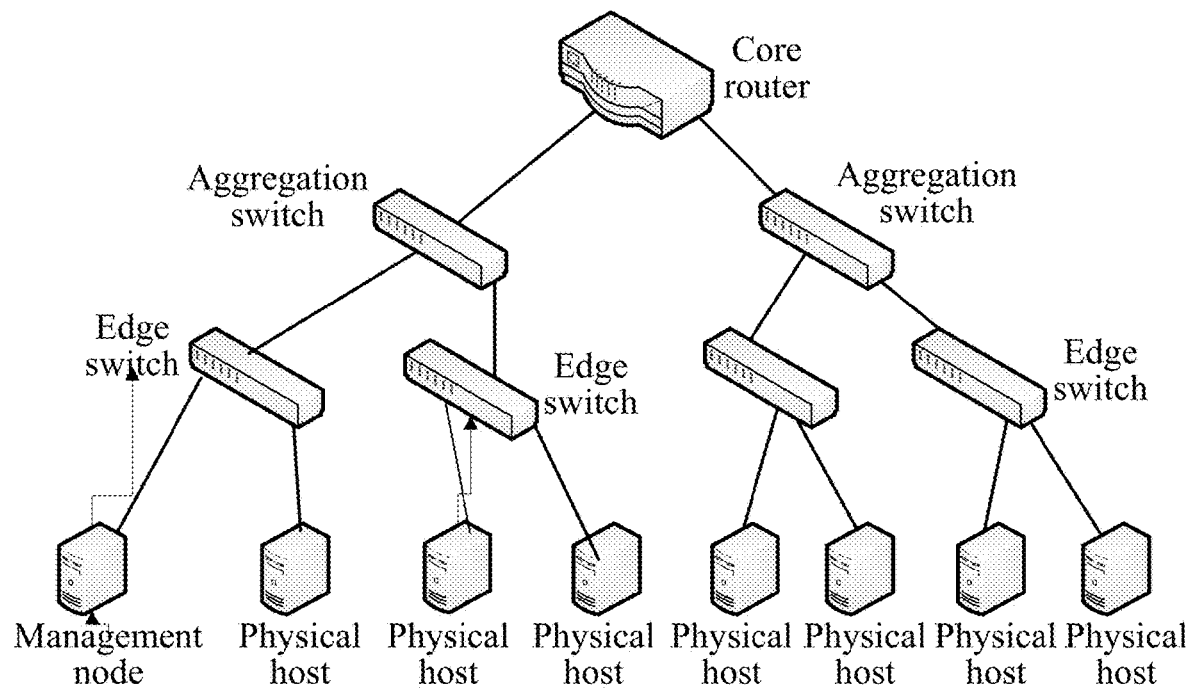
FIG. 5 is a schematic diagram of a topology of a data center according to an embodiment of the present disclosure.

For example, in a data center of an architecture shown in FIG. 5, a management node may estimate a traffic between virtual machines deployed in each physical host connected to each edge switch, the management node may obtain a topology of a tree network by sending a probe packet, and the management node may also send a traffic rate request message to a physical host, each switch and a core router, so as to online obtain receiving and sending traffic rates of each virtual machine, and receiving and sending traffic rates of each port of each switch/the core router. After the management node estimates a traffic rate between virtual machines, the management node may migrate a pair of virtual machines with a large traffic rate into a same physical host, or deploy them in a physical host with a short path. The management node may further migrate a pair of virtual machines with a small traffic rate into different physical hosts, for example, migrate them into physical hosts with long paths. Certainly the management node may also further perform other policy control based on the estimated traffic rate between the virtual machines.

Certainly, information such as the receiving and sending traffic rates of each virtual machine, and the receiving and sending traffic rates of each port of each switch/the core router may be offline buffered in a server, and the management node may offline obtain, from the server, the receiving and sending traffic rates of each virtual machine, and the receiving and sending traffic rates of each port of each switch/the core router. However, in an offline scenario, the management node does not need to obtain, directly from a physical host, each switch and the core router, the receiving and sending traffic rates of each virtual machine, and the receiving and sending traffic rates of each port of each switch/the core router.

A related apparatus configured to implement the foregoing solution is further provided below.

Figure 6:
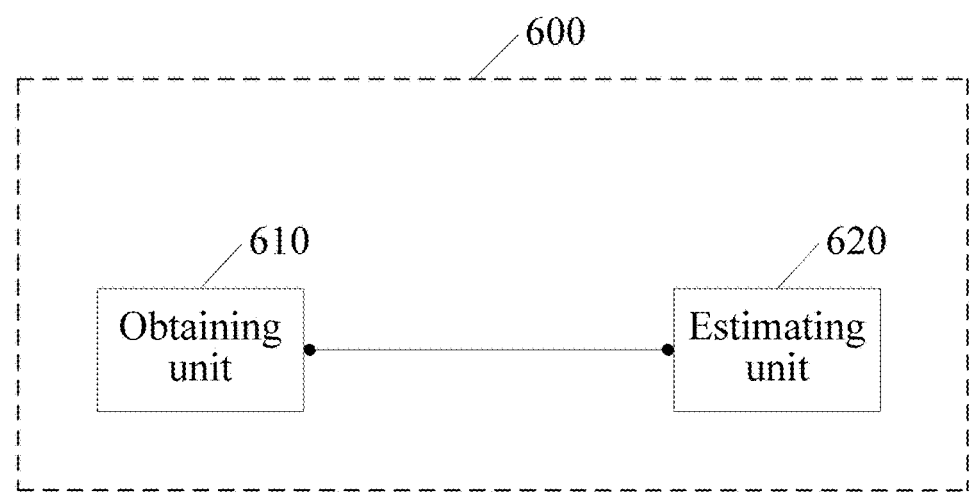
FIG. 6 is a schematic diagram of an estimating apparatus according to an embodiment of the present disclosure.

Referring to FIG. 6, FIG. 6 is a schematic diagram of an apparatus 600 for estimating a traffic rate between a virtual machine pair according to an embodiment of the present disclosure. The virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 switching devices including a switching device sw-x1 and a switching device sw-x2 are connected to N4 switching devices; N2 physical hosts including the physical host pm-x are lower-layer nodes of the switching device sw-x1; and N3 physical hosts including the physical host pm-y are lower-layer nodes of the remaining switching devices of the N1 switching devices except the switching device sw-x1, where the N4 switching devices are parent nodes of the N1 switching devices, the N1 is an integer greater than 1, and the N2 and the N3 are positive integers.

The apparatus 600 for estimating a traffic rate between a virtual machine pair may include an obtaining unit 610 and an estimating unit 620.

The obtaining unit 610 is configured to obtain a traffic parameter set.

The traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices, where the outgoing traffic of the N4 switching devices do not include traffic sent by the N4 switching devices to the N1 switching devices, the N4, the N21 and the N31 are positive integers.

The estimating unit 620 is configured to estimate, based on the traffic parameter set, a rate of traffic sent by the virtual machine vm-x1 to the virtual machine vm-y1.

Optionally, in some possible implementation manners of the present disclosure, the estimating unit 620 may be configured to estimate, based on the traffic parameter set and by using the following formula, the rate of traffic sent by the virtual machine vm-x1 to the virtual machine vm-y1, $$T_{vm-x1 \to vm-y1} = \Sigma_{sw-xk \in Ln1} \left( \frac{T_{vm-y1}^{in}}{Q_{N31}^{in}} \times \left( T_{vm-x1}^{out} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $Q_{N21}^{out}$ indicates a sum of rates of sending traffic of the N21 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, and the $Q_{N1}^{out-(sw-xk)}$ indicates a sum of rates of traffic sent by the N1 switching devices to the switching device sw-xk, where the $T_{sw-xk}^{out}$ indicates a rate of outgoing traffic of the switching device sw-xk, the Ln1 is a switching device set including the N4 switching devices, and the switching device sw-xk belongs to the Ln1.

Optionally, in some possible implementation manners of the present disclosure, the traffic parameter set further includes a corrected traffic parameter $K_{vm-x1}$ corresponding to the virtual machine vm-x1, where the $K_{vm-x1}$ is equal to $Q_{vm-x1-(pm-x)}$ or is obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

Optionally, in some possible implementation manners of the present disclosure, the estimating unit 620 is further configured to estimate, based on the following formula, a rate $T_{vm-x \to vm-i}$ of traffic sent by the virtual machine vm-x1 to any virtual machine vm-i of the N211 virtual machines except the virtual machine vm-x1, where $$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times \left( T_{vm-i}^{in} - \left( \frac{T_{vm-i}^{in}}{Q_{N211}^{in}} \times T_{pm-x}^{in} \right) \right).$$

The $T_{vm-x1 \to vm-i}$ indicates a rate of traffic sent by the virtual machine vm-x1 to the virtual machine vm-i of the N211 virtual machines, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{N211}^{out}$ indicates a sum of rates of sending traffic of the N211 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{N211}^{in}$ indicates a sum of rates of receiving traffic of the N211 virtual machines, the $T_{pm-x}^{out}$ indicates a rate of traffic sent by the physical host pm-x to a parent node of the physical host pm-x, the $T_{pm-x}^{in}$ indicates a rate of traffic received by the physical host pm-x from a parent node of the physical host pm-x, and the virtual machine vm-i is any virtual machine of the N211 virtual machines except the virtual machine vm-x1.

Optionally, in some possible implementation manners of the present disclosure, the $K_{vm-x1}$ is equal to a sum of the Qvm-x1-(pm-x) and $Q_{vm-x1-(sw-x3)}$, or the $K_{vm-x1}$ is obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts, and the switching device sw-x3 is a lower-layer node of the switching device sw-x1, where the N212 is a positive integer greater than 1, and the N2121 is a positive integer, $$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right) \text{ or}$$

-continued $$T_{vm-x1 \to vm-j} = \frac{T_{vm-j}^{in}}{Q_{N2121}^{in}} \times \left(T_{vm-x1}^{out} - Q_{vm-x1-(pm-x)} - \left(\frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out}\right)\right),$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the deployed N2121 virtual machines, where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, and the virtual machine vm-j is any virtual machine deployed in the physical host pm-xj, where the outgoing traffic of the switching device sw-x3 does not include traffic sent by the switching device sw-x3 to the N212 physical hosts.

Optionally, in some possible implementation manners of the present disclosure, the estimating unit 620 is configured to estimate, based on the traffic parameter set and by using the following formula, the rate of traffic sent by the virtual machine vm-x1 to the virtual machine vm-y1, $$T_{vm-x1 \to vm-y1} = \Sigma_{sw-xk \in Ln1} \left(\frac{T_{vm-y1}^{in}}{Q_{N31}^{in}} \times \left(T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out}\right)\right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

It can be understood that, functions of functional modules of the estimating apparatus 600 of this embodiment may be implemented according to the method in the foregoing method embodiment, and for the specific implementation process thereof, reference may be made to the related description of the foregoing method embodiment, which is not described herein again.

The estimating apparatus 600 of this embodiment may be a management node or be deployed in a management node, where the management node may be communicatively connected to the N1 switching devices, the N4 switching devices, the N2 physical hosts and/or the N3 physical hosts, the management node may be a root node of a tree network to which the N4 switching devices belong or the management node may also be a lower-layer node of the root node of the tree network to which the N4 switching devices belong (where the management node may even be one of the N1 switching devices, the N4 switching devices, the N2 physical hosts and the N3 physical hosts, for example, the management node may be a physical host or a switching device), and certainly, the management node may also be a device outside the tree network to which the N4 switching devices belong. The management node may, for example, send traffic rate reporting requests to nodes of the tree network to which the N4 switching devices such as the N1 switching devices, the N4 switching devices, the N2 physical hosts and the N3 physical hosts belong, so as to online obtain a related traffic rate that the node of the tree network to which the N4 switching devices such as the N1 switching devices, the N4 switching devices, the N2 physical hosts and the N3 physical hosts belong requests to feed back based on the traffic rate reporting request (for example, the management node may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node to respond to the traffic rate reporting request, similarly, the management node may send a traffic rate reporting request to the switching device sw-x1, the switching device sw-x1 may, for example, feed back a related traffic rate, such as a rate of traffic sent by the switching device sw-x1 to a parent node, or a rate of receiving traffic by the switching device sw-x1 from a parent node, to the management node to respond to the traffic rate reporting request, and the rest can be deduced by analogy). Furthermore, the management node may also be not communicatively connected to a node in the tree network to which the N4 switching devices such as the N1 switching devices, the N4 switching devices, the N2 physical hosts and/or the N3 physical hosts belong, and therefore, the management node may also offline obtain the related traffic rate of the node of the tree network to which the N4 switching devices such as the N1 switching devices, the N4 switching devices, the N2 physical hosts and the N3 physical hosts belong.

It can be seen that, in the solution of this embodiment, when a rate of traffic sent by the virtual machine vm-x1 to the virtual machine vm-y1 is estimated by the estimating apparatus 600, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

Figure 7:
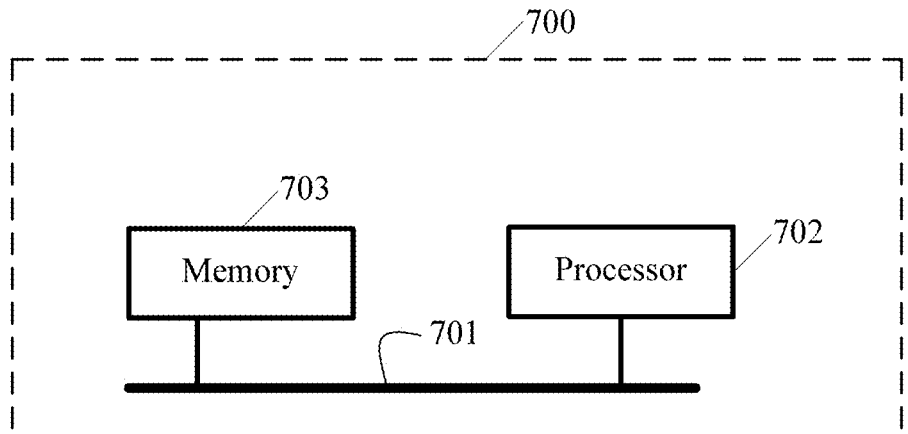
FIG. 7 is a schematic diagram of a management node according to an embodiment of the present disclosure.

Referring to FIG. 7, FIG. 7 is a schematic diagram of a management device 700 according to an embodiment of the present disclosure, and the management device 700 may include at least one bus 701, at least one processor 702 connected to the bus 701 and at least one memory 703 connected to the bus 701.

The processor 702 invokes, by using the bus 701, code stored in the memory 703 to be configured to obtain a traffic parameter set, where a virtual machine pair includes a virtual machine vm-x1 and a virtual machine vm-y1; and estimate, based on the traffic parameter set, a rate of traffic sent by the virtual machine vm-x1 to the virtual machine vm-y1.

The virtual machine vm-x1 is deployed in a physical host pm-x, and the virtual machine vm-y1 is deployed in a physical host pm-y. N1 switching devices including a switching device sw-x1 and a switching device sw-x2 are connected to N4 switching devices. N2 physical hosts including the physical host pm-x are lower-layer nodes of the switching device sw-x1 (that is, a layer difference between the N2 physical hosts and a root node is greater than a layer difference between the switching device sw-x1 and the root node, for example, the N2 physical hosts may be child nodes, grandchild nodes or lower-layer nodes of the switching device sw-x1). N3 physical hosts including the physical host pm-y are lower-layer nodes of the remaining switching devices (the remaining switching devices include the switching device sw-x2) of the N1 switching devices except the switching device sw-x1 (that is, a layer difference between the N3 physical hosts and the root node is greater than a layer difference between the switching device sw-x2 and the root node, for example, the N3 physical hosts may be child nodes, grandchild nodes or lower-layer nodes of the remaining switching devices of the N1 switching devices except the switching device sw-x1). The N4 switching devices are parent nodes of the N1 switching devices, where the N1 is an integer greater than 1, and the N2 and the N3 are positive integers.

An intersection set between the N2 physical hosts and the N3 physical hosts may be an empty set or a non-empty set. The N2 physical hosts are, for example, some or all lower-layer nodes of the switching device sw-x1. The N3 physical hosts are, for example, some or all lower-layer nodes of the remaining switching devices of the N1 switching devices except the switching device sw-x1.

The traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The outgoing traffic of the N4 switching devices do not include traffic sent by the N4 switching devices to the N1 switching devices, and the N4, the N21 and the N31 are positive integers.

The switching device mentioned in this embodiment of the present disclosure may be a switch or router. The method of this embodiment of the present disclosure may be applied to a tree network.

The N31 virtual machines are, for example, some or all virtual machines deployed in the N3 physical hosts. The N21 virtual machines are, for example, some or all virtual machines deployed in the N2 physical hosts. The N1 switching devices may be some or all child nodes of the N4 switching devices. The N4 switching devices may be some or all parent nodes of the N1 switching devices.

The virtual machine vm-x1 is any virtual machine of the N21 virtual machines, and the virtual machine vm-y1 may be any virtual machine that is of the N31 virtual machines and deployed in the physical host pm-y.

Specific manners of estimating, based on the traffic parameter set, a rate of traffic sent by the virtual machine vm-x1 to the virtual machine vm-y1 may be various, and some possible implementation manners are described as follows For example, the processor 702 may be configured to estimate, based on the traffic parameter set and by using the following formula, the rate of traffic sent by the virtual machine vm-x1 to the virtual machine vm-y1.

$$T_{vm-x1 \to vm-y1} = \Sigma_{sw-xk \in Ln1} \left( \frac{T_{vm-y1}^{in}}{Q_{N31}^{in}} \times \left( T_{vm-x1}^{out} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $Q_{N21}^{out}$ indicates a sum of rates of sending traffic of the N21 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

Optionally, the traffic parameter set further includes a corrected traffic parameter $K_{vm-x1}$ corresponding to the virtual machine vm-x1. The $K_{vm-x1}$ may be equal to $Q_{vm-x1-(pm-x)}$ or may be obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

For example, the processor 702 may be configured to estimate, based on the following formula, a rate $T_{vm-x1 \to vm-i}$ of traffic sent by the virtual machine vm-x1 to any virtual machine vm-i of the N211 virtual machines except the virtual machine vm-x1, where $$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times$$

$$\left( T_{vm-i}^{in} - \left( \frac{T_{vm-i}^{in}}{Q_{N211}^{in}} \times T_{pm-x}^{in} \right) \right),$$

where the $T_{vm-x1 \to vm-i}$ indicates a rate of traffic sent by the virtual machine vm-x1 to the virtual machine vm-i of the N211 virtual machines, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{N211}^{in}$ indicates a sum of rates of sending traffic of the N211 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{N211}^{in}$ indicates a sum of rates of receiving traffic of the N211 virtual machines, the $T_{pm-x}^{out}$ indicates a rate of traffic sent by the physical host pm-x to a parent node of the physical host pm-x, the $T_{pm-x}^{in}$ indicates a rate of traffic received by the physical host pm-x from a parent node of the physical host pm-x, and the virtual machine vm-i is any virtual machine of the N211 virtual machines except the virtual machine vm-x1.

Optionally, the $K_{vm-x1}$ may be equal to a sum of the $Q_{vm-x1-(pm-x)}$ and $Q_{vm-x1-(sw-x3)}$, or the $K_{vm-x1}$ may be obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts (for example, the N212 physical hosts may be some or all child nodes of the switching device sw-x3), where and the switching device sw-x3 is a lower-layer node of the switching device sw-x1, where the N212 is a positive integer greater than 1, and the N2121 is a positive integer.

$$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right) \text{ or}$$

$$T_{vm-x1 \to vm-j} = \frac{T_{vm-j}^{in}}{Q_{N2121}^{in}} \times \left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right),$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the N2121 virtual machines (the N2121 virtual machines may be some or all virtual machines deployed on physical hosts of the N212 physical hosts except the physical host pm-x), where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, where the virtual machine vm-j may be any virtual machine deployed in the physical host pm-xj, and the outgoing traffic of the switching device sw-x3 does not include traffic sent by the switching device sw-x3 to the N212 physical hosts, for example, the outgoing traffic of the switching device sw-x3 is a traffic sent by the switching device sw-x3 to an upper-layer node of the switching device sw-x3.

Also optionally, the processor 702 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln1} \left( \frac{T_{vm-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, the processor 702 may be further configured to, after a traffic rate between virtual machines is estimated, migrate a pair of virtual machines with a large traffic rate into a same physical host, or migrate them into a physical host with a short path. Furthermore, a pair of virtual machines with a small traffic rate may be migrated into different physical hosts, for example, migrated into physical hosts with long paths. Certainly other policy control may be further performed based on the estimated traffic rate between the virtual machines.

It can be understood that, functions of functional modules of the management node 700 of this embodiment may be implemented according to the method in the foregoing method embodiment, and for the specific implementation process thereof, reference may be made to the related description of the foregoing method embodiment, which is not described herein again.

In this embodiment, the management node 700 may be communicatively connected to the N1 switching devices, the N4 switching devices, the N2 physical hosts and/or the N3 physical hosts, the management node 700 may be a root node of a tree network to which the N4 switching devices belong or the management node 700 may also be a lower-layer node of the root node of the tree network to which the N4 switching devices belong (where the management node 700 may even be one of the N1 switching devices, the N4 switching devices, the N2 physical hosts and the N3 physical hosts, for example, the management node 700 may be a physical host or a switching device), and certainly, the management node 700 may also be a device outside the tree network to which the N4 switching devices belong. The management node 700 may, for example, send traffic rate reporting requests to nodes of the tree network to which the N4 switching devices belong such as the N1 switching devices, the N4 switching devices, the N2 physical hosts and the N3 physical hosts belong, so as to online obtain a related traffic rate that the node of the tree network to which the N4 switching devices such as the N1 switching devices, the N4 switching devices, the N2 physical hosts and the N3 physical hosts belong requests to feed back based on the traffic rate reporting request (for example, the management node 700 may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node 700 to respond to the traffic rate reporting request, similarly, the management node 700 may send a traffic rate reporting request to the switching device sw-x1, the switching device sw-x1 may, for example, feed back a related traffic rate, such as a rate of traffic sent by the switching device sw-x1 to a parent node, or a rate of receiving traffic by the switching device sw-x1 from a parent node, to the management node 700 to respond to the traffic rate reporting request, and the rest can be deduced by analogy). Furthermore, the management node 700 may also be not communicatively connected to a node in the tree network to which the N4 switching devices such as the N1 switching devices, the N4 switching devices, the N2 physical hosts and/or the N3 physical hosts belong, and therefore, the management node 700 may also offline obtain the related traffic rate of the node of the tree network to which the N4 switching devices such as the N1 switching devices, the N4 switching devices, the N2 physical hosts and the N3 physical hosts belong.

It can be seen that, in the solution of this embodiment, when a rate of traffic sent by the virtual machine vm-x1 to the virtual machine vm-y1 is estimated by the management node 700, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

Figure 8:
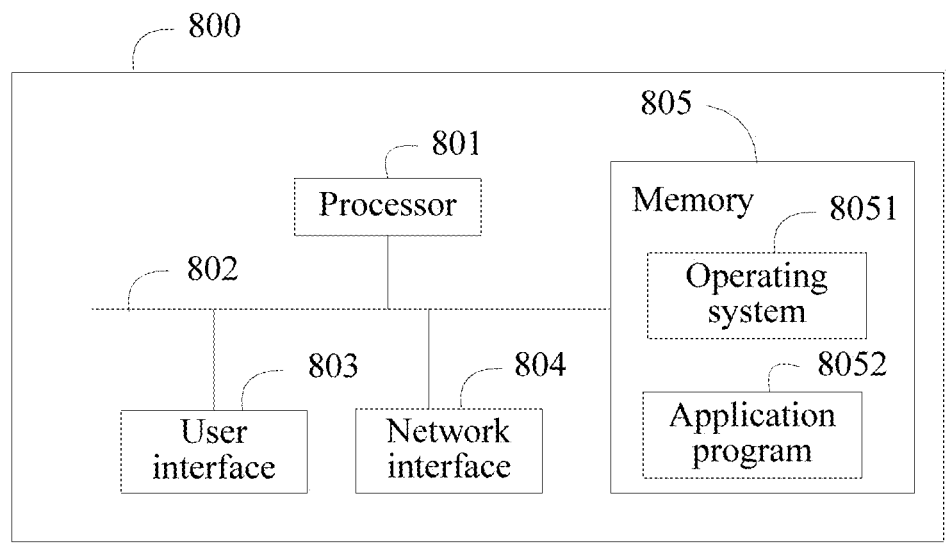
FIG. 8 is a schematic diagram of another management node according to an embodiment of the present disclosure.

Referring to FIG. 8, FIG. 8 is a structural block diagram of a management node 800 according to another embodiment of the present disclosure. The management node 800 may include at least one processor 801, at least one network interface 804 or another user interface 803, a memory 805, and at least one communications bus 802. The communications bus 802 is configured to implement connection and communication between these components.

The management node 800 optionally includes the user interface 803, including a display (such as, a touch screen, a crystal liquid display, a holographic display or projector), a click device (such as, a mouse, a trackball touch panel or touch screen), a camera and/or a sound pickup apparatus.

The memory 802 may include a read only memory and a random access memory, and provide instructions and data to the processor 801. A part in the memory 802 may further include a non-volatile random access memory.

In some implementation manners, the memory 805 stores the following elements, an executable module, or a data structure, or a subset of the following elements, the executable module, and the data structure, or an extension set of the following elements, the executable module, and the data structure an operating system 8051, including various system programs which are used for implementing various basic services and processing a task based on hardware, and an application program module 8052, including various application programs, and configured to implement various application services.

The application program module 8052 includes, but is not limited to, at least one unit of the obtaining unit 610 and the estimating unit 620 in the structure shown in FIG. 6.

In some other possible scenarios, assuming that the management node 800 has a virtualization architecture, the memory 805 may store a host and at least one virtual machine, where at least one unit of the obtaining unit 610 and the estimating unit 620 may be deployed in the host or virtual machine.

In this embodiment of the present disclosure, by invoking a program or an instruction stored in the memory 805, the processor 801 obtains a traffic parameter set, a virtual machine pair includes a virtual machine vm-x1 and a virtual machine vm-y1; and estimates, based on the traffic parameter set, a rate of traffic sent by the virtual machine vm-x1 to the virtual machine vm-y1.

The virtual machine vm-x1 is deployed in a physical host pm-x, and the virtual machine vm-y1 is deployed in a physical host pm-y. N1 switching devices including a switching device sw-x1 and a switching device sw-x2 are connected to N4 switching devices. N2 physical hosts including the physical host pm-x are lower-layer nodes of the switching device sw-x1 (that is, a layer difference between the N2 physical hosts and a root node is greater than a layer difference between the switching device sw-x1 and the root node, for example, the N2 physical hosts may be child nodes, grandchild nodes or lower-layer nodes of the switching device sw-x1). N3 physical hosts including the physical host pm-y are lower-layer nodes of the remaining switching devices (the remaining switching devices include the switching device sw-x2) of the N1 switching devices except the switching device sw-x1 (that is, a layer difference between the N3 physical hosts and the root node is greater than a layer difference between the switching device sw-x2 and the root node, for example, the N3 physical hosts may be child nodes, grandchild nodes or lower-layer nodes of the remaining switching devices of the N1 switching devices except the switching device sw-x1). The N4 switching devices are parent nodes of the N1 switching devices, the N1 is an integer greater than 1, and the N2 and the N3 are positive integers.

An intersection set between the N2 physical hosts and the N3 physical hosts may be an empty set or a non-empty set. The N2 physical hosts are, for example, some or all lower-layer nodes of the switching device sw-x1. The N3 physical hosts are, for example, some or all lower-layer nodes of the remaining switching devices of the N1 switching devices except the switching device sw-x1.

The traffic parameter set includes rates of sending traffic of N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The outgoing traffic of the N4 switching devices do not include traffic sent by the N4 switching devices to the N1 switching devices, and the N4, the N21 and the N31 are positive integers.

The switching device mentioned in this embodiment of the present disclosure may be a switch or router. The method of this embodiment of the present disclosure may be applied to a tree network.

The N31 virtual machines are, for example, some or all virtual machines deployed in the N3 physical hosts. The N21 virtual machines are, for example, some or all virtual machines deployed in the N2 physical hosts. The N1 switching devices may be some or all child nodes of the N4 switching devices. The N4 switching devices may be some or all parent nodes of the N1 switching devices.

The virtual machine vm-x1 is any virtual machine of the N21 virtual machines, and the virtual machine vm-y1 may be any virtual machine that is of the N31 virtual machines and deployed in the physical host pm-y.

Specific manners of estimating, based on the traffic parameter set, a rate of traffic sent by the virtual machine vm-x1 to the virtual machine vm-y1 may be various, and some possible implementation manners are described as follows For example, the processor 801 may be configured to estimate, based on the traffic parameter set and by using the following formula, the rate of traffic sent by the virtual machine vm-x1 to the virtual machine vm-y1.

$$T_{vm-x1 \to vm-y1} = \sum_{sw-xk \in Ln1} \left( \frac{T_{vm-y1}^{in}}{Q_{N31}^{in}} \times \left( T_{vm-x1}^{out} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $Q_{N21}^{out}$ indicates a sum of rates of sending traffic of the N21 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

Optionally, the traffic parameter set further includes a corrected traffic parameter $K_{vm-x1}$ corresponding to the virtual machine vm-x1. The $K_{vm-x1}$ may be equal to $Q_{vm-x1-(pm-x)}$ or may be obtained based on the $Q_{vm-x1-(pm-x)}$, N211 virtual machines are deployed in the physical host pm-x, the $Q_{vm-x1-(pm-x)}$ is a sum of rates of traffic sent by the virtual machine vm-x1 to virtual machines of the N211 virtual machines except the virtual machine vm-x1, and the N211 virtual machines are a subset of the N21 virtual machines.

For example, the processor 801 may be configured to estimate, based on the following formula, a rate $T_{vm-x1 \to vm-i}$ of traffic sent by the virtual machine vm-x1 to any virtual machine vm-i of the N211 virtual machines except the virtual machine vm-x1, where $$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times$$

$$\left( T_{vm-i}^{in} - \left( \frac{T_{vm-i}^{in}}{Q_{N211}^{in}} \times T_{pm-x}^{in} \right) \right).$$

The $T_{vm-x1 \to vm-i}$ indicates a rate of traffic sent by the virtual machine vm-x1 to the virtual machine vm-i of the N211 virtual machines, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{N211}^{out}$ indicates a sum of rates of sending traffic of the N211 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{N211}^{in}$ indicates a sum of rates of receiving traffic of the N211 virtual machines, the $T_{pm-x}^{out}$ indicates a rate of traffic sent by the physical host pm-x to a parent node of the physical host pm-x, the $T_{pm-x}^{in}$ indicates a rate of traffic received by the physical host pm-x from a parent node of the physical host pm-x, and the virtual machine vm-i is any virtual machine of the N211 virtual machines except the virtual machine vm-x1.

Optionally, the $K_{vm-x1}$ may be equal to a sum of the $Q_{vm-x1-(pm-x)}$ and $Q_{vm-x1-(sw-x3)}$, or the $K_{vm-x1}$ may be obtained based on the $Q_{vm-x1-(pm-x)}$ and $Q_{vm-x1-(sw-x3)}$; the $Q_{vm-x1-(sw-x3)}$ is a sum of rates of traffic from the virtual machine vm-x1 to N2121 virtual machines, where N212 physical hosts including the physical host pm-x are connected to a switching device sw-x3, and the N2121 virtual machines are deployed in physical hosts of the N212 physical hosts except the physical host pm-x; the N212 physical hosts are a subset of the N2 physical hosts, where the N2121 virtual machines are a subset of the N21 virtual machines; the switching device sw-x3 is a parent node of the N212 physical hosts (for example, the N212 physical hosts may be some or all child nodes of the switching device sw-x3), where and the switching device sw-x3 is a lower-layer node of the switching device sw-x1, where the N212 is a positive integer greater than 1, and the N2121 is a positive integer.

$$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right) \text{ or}$$

$$T_{vm-x1 \to vm-j} =$$

$$\frac{T_{vm-j}^{in}}{Q_{N2121}^{in}} \times \left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right)$$

where the $T_{vm-x1 \to vm-j}$ indicates a rate of traffic sent by the virtual machine vm-x1 to a virtual machine vm-j, the $T_{vm-j}^{in}$ indicates a rate of receiving traffic of the virtual machine vm-j, the $Q_{N2121}^{in}$ indicates a sum of rates of receiving traffic of the N2121 virtual machines (the N2121 virtual machines may be some or all virtual machines deployed on physical hosts of the N212 physical hosts except the physical host pm-x), where the $T_{vm-x1}^{out}$ indicates a rate of sending traffic of the virtual machine vm-x1, the $T_{pm-x}^{out-(sw-x3)}$ indicates a rate of traffic sent by the physical host pm-x to the switching device sw-x3, the $Q_{N212}^{out-(sw-x3)}$ indicates a sum of rates of traffic sent by the N212 physical hosts to the switching device sw-x3, the $T_{sw-x3}^{out}$ indicates a rate of outgoing traffic of the switching device sw-x3, the physical host pm-xj is any physical host of the N212 physical hosts except the physical host pm-x, where the virtual machine vm-j may be any virtual machine deployed in the physical host pm-xj, and the outgoing traffic of the switching device sw-x3 does not include traffic sent by the switching device sw-x3 to the N212 physical hosts, for example, the outgoing traffic of the switching device sw-x3 is a traffic sent by the switching device sw-x3 to an upper-layer node of the switching device sw-x3.

Also optionally, the processor 801 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln1} \left( \frac{T_{vm-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

where the $T_{vm-x1 \to vm-y1}$ indicates a traffic rate from the virtual machine vm-x1 to the virtual machine vm-y1, the $T_{vm-y1}^{in}$ indicates a rate of receiving traffic of the virtual machine vm-y1, the $Q_{N31}^{in}$ indicates a sum of rates of receiving traffic of the N31 virtual machines, the $T_{vm-x1}^{out}$ indicates a rate of sending traffic of the virtual machine vm-x1, the $T_{sw-x1}^{out-(sw-xk)}$ indicates a rate of traffic sent by the switching device sw-x1 to a switching device sw-xk, the $Q_{N1}^{out-(sw-xk)}$ indicates a sum of rates of traffic sent by the N1 switching devices to the switching device sw-xk, the $T_{sw-xk}^{out}$ indicates a rate of outgoing traffic of the switching device sw-xk, the Ln1 is a switching device set including the N4 switching devices, and the switching device sw-xk belongs to the Ln1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, the processor 801 may be further configured to, after a traffic rate between virtual machines is estimated, migrate a pair of virtual machines with a large traffic rate into a same physical host, or migrate them into a physical host with a short path. Furthermore, a pair of virtual machines with a small traffic rate may be migrated into different physical hosts, for example, migrated into physical hosts with long paths. Certainly other policy control may be further performed based on the estimated traffic rate between the virtual machines.

It can be understood that, functions of functional modules of the management node 800 of this embodiment may be implemented according to the method in the foregoing method embodiment, and for the specific implementation process thereof, reference may be made to the related description of the foregoing method embodiment, which is not described herein again.

In this embodiment, the management node 800 may be communicatively connected to the N1 switching devices, the N4 switching devices, the N2 physical hosts and/or the N3 physical hosts, the management node 800 may be a root node of a tree network to which the N4 switching devices belong or the management node 800 may also be a lower-layer node of the root node of the tree network to which the N4 switching devices belong (where the management node 800 may even be one of the N1 switching devices, the N4 switching devices, the N2 physical hosts and the N3 physical hosts, for example, the management node 800 may be a physical host or a switching device), and certainly, the management node 800 may also be a device outside the tree network to which the N4 switching devices belong. The management node 800 may, for example, send traffic rate reporting requests to nodes of the tree network to which the N4 switching devices such as the N1 switching devices, the N4 switching devices, the N2 physical hosts and the N3 physical hosts belong, so as to online obtain a related traffic rate that the node of the tree network to which the N4 switching devices such as the N1 switching devices, the N4 switching devices, the N2 physical hosts and the N3 physical hosts belong requests to feed back based on the traffic rate reporting request (for example, the management node 800 may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node 800 to respond to the traffic rate reporting request, similarly, the management node 800 may send a traffic rate reporting request to the switching device sw-x1, the switching device sw-x1 may, for example, feed back a related traffic rate, such as a rate of traffic sent by the switching device sw-x1 to a parent node, or a rate of receiving traffic by the switching device sw-x1 from a parent node, to the management node 800 to respond to the traffic rate reporting request, and the rest can be deduced by analogy). Furthermore, the management node 800 may also be not communicatively connected to a node in the tree network to which the N4 switching devices such as the N1 switching devices, the N4 switching devices, the N2 physical hosts and/or the N3 physical hosts belong, and therefore, the management node 800 may also offline obtain the related traffic rate of the node of the tree network to which the N4 switching devices such as the N1 switching devices, the N4 switching devices, the N2 physical hosts and the N3 physical hosts belong.

It can be seen that, in the solution of this embodiment, when a rate of traffic sent by the virtual machine vm-x1 to the virtual machine vm-y1 is estimated by the management node 800, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

Figure 9:
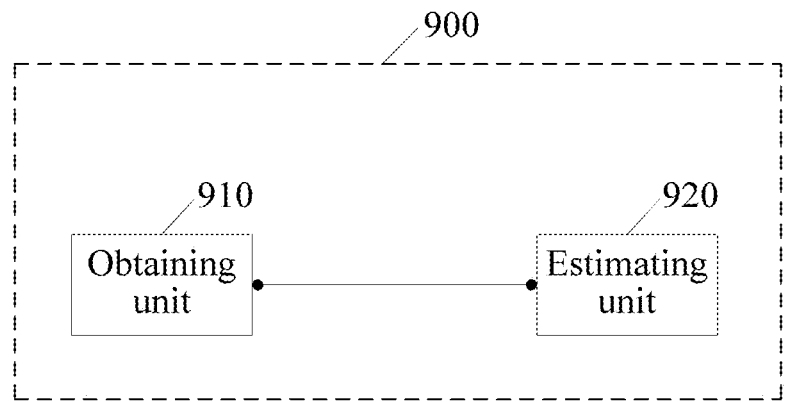
FIG. 9 is a schematic diagram of an estimating apparatus according to an embodiment of the present disclosure.

Referring to FIG. 9, FIG. 9 is a schematic diagram of an apparatus 900 for estimating a traffic rate between a virtual machine pair according to an embodiment of the present disclosure. The virtual machine pair includes a virtual machine vm-x1 and a virtual machine vm-y1, the virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts; the N1 is an integer greater than 1, and the N2 is a positive integer, The apparatus 900 for estimating a traffic rate between a virtual machine pair may include an obtaining unit 910 configured to obtain a traffic parameter set, where the traffic parameter set includes rates of sending traffic of M21 virtual machines deployed in the physical host pm-x and including the virtual machine vm-x1, rates of receiving traffic of M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices, where the outgoing traffic of the N5 switching devices do not include traffic sent by the N5 switching devices to the N1 physical hosts, where the N21, the N5, and the N31 are positive integers, and an estimating unit 920, estimating, based on the traffic parameter set, a rate of traffic sent by the virtual machine vm-x1 to the virtual machine vm-y1.

Optionally, in some possible implementation manners of the present disclosure, the estimating unit is configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{sw-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

Optionally, in some other possible implementation manners of the present disclosure, the estimating unit 920 is configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \right.$$

$$\left. \left( T_{vm-x1}^{out} - Q_{vm-x1-(pm-x)} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right);$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{out}$ indicates a sum of rates of receiving traffic of the M321 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2, where the $Q_{vm-x1-(pm-x)}$ is a sum of rates of traffic sent by the virtual machine vm-x1 to virtual machines of the M21 virtual machines except the virtual machine vm-x1.

Optionally, in some possible implementation manners of the present disclosure, the estimating unit 920 is further configured to estimate, based on the following formula, a rate $T_{vm-x1\_-vm-i}$ of traffic sent by the virtual machine vm-x1 to any virtual machine vm-i of the M21 virtual machines except the virtual machine vm-x1, where $$T_{vm-x1 \to vm-i} =$$

$$\left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right).$$

The $T_{vm-x1 \to vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{M21}^{in}$ indicates a sum of rates of receiving traffic of the M21 virtual machines, the $T_{pm-x}^{out}$ indicates rates of traffic sent by the physical host pm-x to the N5 switching devices, the $T_{pm-x}^{in}$ indicates rates of traffic received by the physical host pm-x from the N5 switching devices, and the virtual machine vm-i is any virtual machine of the M21 virtual machines except the virtual machine vm-x1.

Further, after a traffic rate between virtual machines is estimated, the estimating apparatus 900 may migrate a pair of virtual machines with a large traffic rate into a same physical host, or migrate them into a physical host with a short path. Furthermore, a pair of virtual machines with a small traffic rate may be migrated into different physical hosts, for example, migrated into physical hosts with long paths. Certainly other policy control may be further performed based on the estimated traffic rate between the virtual machines.

It can be understood that, functions of functional modules of the estimating apparatus 900 of this embodiment may be implemented according to the method in the foregoing method embodiment, and for the specific implementation process thereof, reference may be made to the related description of the foregoing method embodiment, which is not described herein again.

The estimating apparatus 900 may, for example, be a management node or be deployed in a management node, where the management node may be communicatively connected to the N1 physical hosts and/or the N5 switching devices, the management node may be a root node of a tree network to which the N5 switching devices belong or the management node may also be a lower-layer node of the root node of the tree network to which the N5 switching devices belong (where the management node may even be one of the N5 switching devices and the N1 physical hosts, for example, the management node may be a physical host or a switching device), and certainly, the management node may also be a device outside the tree network to which the N5 switching devices belong. The management node may, for example, send traffic rate reporting requests to nodes of the tree network to which the N5 switching devices such as the N5 switching devices and the N1 physical hosts belong, so as to online obtain a related traffic rate that the node of the tree network to which the N5 switching devices such as the N5 switching devices and the N1 physical hosts belong requests to feed back based on the traffic rate reporting request (for example, the management node may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node to respond to the traffic rate reporting request, similarly, the management node may send a traffic rate reporting request to a switching device of the N5 switching devices, the switching device may, for example, feed back a related traffic rate, such as a rate of traffic sent by the switching device to a parent node, to the management node to respond to the traffic rate reporting request, and the rest can be deduced by analogy). Furthermore, the management node may also be not communicatively connected to a node in the tree network to which the N5 switching devices such as the N1 physical hosts and the N5 switching devices belong, and therefore the management node may also offline obtain a related traffic rate of the node of the tree network to which the N5 switching devices such as the N1 physical hosts and the N5 switching devices belong.

It can be seen that, in the solution of this embodiment, when a rate of traffic sent by the virtual machine vm-x1 to the virtual machine vm-y1 is estimated by the estimating apparatus 900, reference is made to at least rates of sending traffic of the N21 virtual machines deployed in the N2 physical hosts and including the virtual machine vm-x1, rates of traffic sent by the N1 switching devices to the N4 switching devices, rates of receiving traffic of N31 virtual machines deployed in the N3 physical hosts and including the virtual machine vm-y1, and rates of outgoing traffic of the N4 switching devices. The N4 switching devices are parent nodes of the N1 switching devices including the switching device sw-x1 and the switching device sw-x2, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

Figure 10:
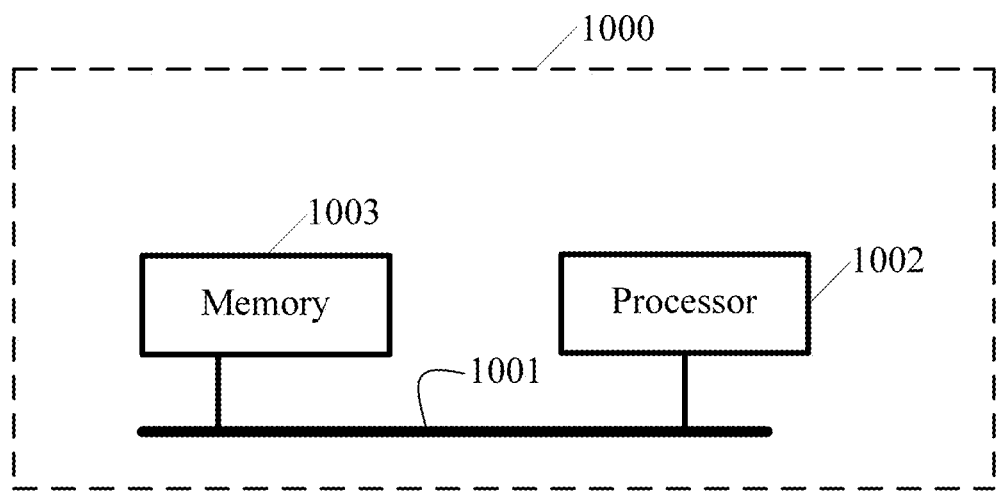
FIG. 10 a schematic diagram of a management node is according to an embodiment of the present disclosure.

Referring to FIG. 10, FIG. 10 is a schematic diagram of a management device 1000 according to an embodiment of the present disclosure, and the management device 1000 may include at least one bus 1001, at least one processor 1002 connected to the bus 1001 and at least one memory 1003 connected to the bus 1001.

The processor 1002 invokes, by using the bus 1001, code stored in the memory 1003 to be configured to obtain a traffic parameter set, where the virtual machine pair includes a virtual machine vm-x1 and a virtual machine vm-y1; and estimate, based on the traffic parameter set, a rate of traffic sent by the virtual machine vm-x1 to the virtual machine vm-y1.

The virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts (for example, the N5 switching devices are some or all parent nodes of the N1 physical hosts, for example, the N1 physical hosts are some or all child nodes of the N5 switching devices). The N1 is an integer greater than 1, and the N2 is a positive integer.

The traffic parameter set includes rates of sending traffic of M21 virtual machines deployed in the physical host pm-x and including the virtual machine vm-x1 (for example, the M21 virtual machines are some or all virtual machines deployed in the physical host pm-x), rates of receiving traffic of M31 virtual machines deployed in the remaining physical hosts (the rest physical hosts include pm-y) of the N1 physical hosts except the physical host pm-x and including the virtual machine vm-y1 (for example, the M31 virtual machines are some or all virtual machines deployed in the remaining physical hosts of the N1 physical hosts except the physical host pm-x), rates of traffic sent by the N1 physical hosts including the physical host pm-y and the physical host pm-x to the N5 switching devices, and rates of outgoing traffic of the N5 switching devices, and the outgoing traffic of the N5 switching devices do not include traffic sent by the N5 switching devices to the N1 physical hosts. The N21, the N5, and the N31 are positive integers.

The physical host pm-x and the physical host pm-y may be any two physical hosts of the N1 physical hosts. The virtual machine vm-x1 is any virtual machine deployed in the physical host pm-x, and the virtual machine vm-y1 may be any virtual machine deployed in the physical host pm-y.

Specific manners of estimating, based on the traffic parameter set, a rate of traffic sent by the virtual machine vm-x1 to the virtual machine vm-y1 may be various, and some possible implementation manners are described as follows For example, the processor 1002 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

For another example, the processor 1002 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \right.$$

$$\left. \left( T_{vm-x1}^{out} - Q_{vm-x1-(pm-x)} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

The $Q_{vm-x1-(pm-x)}$ is a sum of rates of traffic sent by the virtual machine vm-x1 to virtual machines of the M21 virtual machines except the virtual machine vm-x1.

Optionally, the processor 1002 may be configured to estimate, based on the following formula, a rate $T_{vm-x \to vm-i}$ of traffic sent by the virtual machine vm-x1 to any virtual machine vm-i of the M21 virtual machines except the virtual machine vm-x1, where $$T_{vm-x1 \to vm-i} =$$

$$\left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right)$$

The $T_{vm-x1 \to vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-i}^{in}$ indicates a rate of receiving traffic of the virtual machine vm-i; the $T_{vm-i}^{in}$ indicates a rate of receiving traffic of receiving traffic of the virtual machine vm-i; the $Q_{M21}^{in}$ indicates a sum of rates of receiving traffic of the M21 virtual machines, the $T_{pm-x}^{out}$ indicates rates of traffic sent by the physical host pm-x to the N5 switching devices, the $T_{pm-x}^{in}$ indicates rates of traffic received by the physical host pm-x from the N5 switching devices, and the virtual machine vm-i is any virtual machine of the M21 virtual machines except the virtual machine vm-x1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, after a traffic rate between virtual machines is estimated, a pair of virtual machines with a large traffic rate may be migrated into a same physical host, or migrated into a physical host with a short path. Furthermore, a pair of virtual machines with a small traffic rate may be migrated into different physical hosts, for example, may be migrated into physical hosts with long paths. Certainly other policy control may be further performed based on the estimated traffic rate between the virtual machines.

It can be understood that, functions of functional modules of the management node 1000 (for example, a management node of a data center) of this embodiment may be implemented according to the method in the foregoing method embodiment, and for the specific implementation process thereof, reference may be made to the related description of the foregoing method embodiment, which is not described herein again.

The management node 1000 may be communicatively connected to the N1 physical hosts and/or the N5 switching devices, the management node 1000 may be a root node of a tree network to which the N5 switching devices belong or the management node 1000 may also be a lower-layer node of the root node of the tree network to which the N5 switching devices belong (where the management node 1000 may even be one of the N5 switching devices and the N1 physical hosts, for example, the management node 1000 may be a physical host or a switching device), and certainly, the management node 1000 may also be a device outside the tree network to which the N5 switching devices belong. The management node 1000 may, for example, send traffic rate reporting requests to nodes of the tree network to which the N5 switching devices such as the N5 switching devices and the N1 physical hosts belong, so as to online obtain a related traffic rate that the node of the tree network to which the N5 switching devices such as the N5 switching devices and the N1 physical hosts belong requests to feed back based on the traffic rate reporting request (for example, the management node 1000 may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node 1000 to respond to the traffic rate reporting request, similarly, the management node 1000 may send a traffic rate reporting request to a switching device of the N5 switching devices, the switching device may, for example, feed back a related traffic rate, such as a rate of traffic sent by the switching device to a parent node, to the management node 1000 to respond to the traffic rate reporting request, and the rest can be deduced by analogy). Furthermore, the management node 1000 may also be not communicatively connected to a node in the tree network to which the N5 switching devices such as the N1 physical hosts and the N5 switching devices belong, and therefore the management node 1000 may also offline obtain a related traffic rate of the node of the tree network to which the N5 switching devices such as the N1 physical hosts and the N5 switching devices belong.

It can be seen that, in the solution of this embodiment, when a rate of traffic sent by the virtual machine vm-x1 to the virtual machine vm-y1 is estimated by the management node 1000, reference is made to at least rates of sending traffic of the M21 virtual machines deployed in the physical host pm-x and including the virtual machine vm-x1, rates of receiving traffic of the M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices. The N4 switching devices are parent nodes of the N1 physical hosts, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

Figure 11:
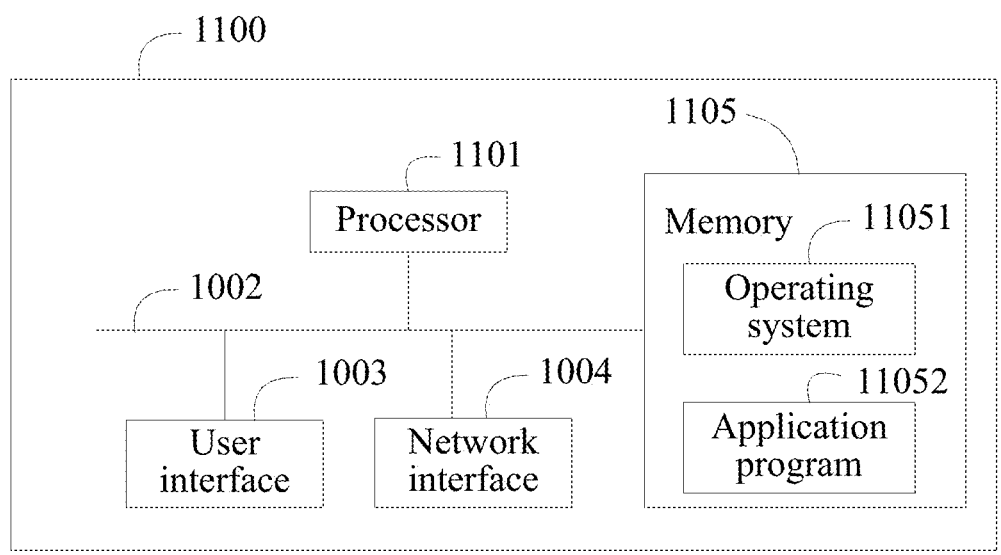
FIG. 11 is a schematic diagram of another management node according to an embodiment of the present disclosure.

Referring to FIG. 11, FIG. 11 is a structural block diagram of a management node 1100 according to another embodiment of the present disclosure. The management node 1100 may include at least one processor 1101, at least one network interface 1104 or another user interface 1103, a memory 1105, and at least one communications bus 1102. The communications bus 1102 is configured to implement connection and communication between these components.

The management node 1100 optionally includes the user interface 1103, including a display (such as, a touch screen, a crystal liquid display, holographic or projection), a click device (such as, a mouse, a trackball touch panel or touch screen), a camera and/or a sound pickup apparatus.

The memory 1102 may include a read only memory and a random access memory, and provide instructions and data to the processor 1101. A part in the memory 1102 may further include a non-volatile random access memory.

In some implementation manners, the memory 1105 stores the following elements, an executable module, or a data structure, or a subset of the following elements, the executable module, and the data structure, or an extension set of the following elements, the executable module, and the data structure an operating system 11051, including various system programs which are used for implementing various basic services and processing a task based on hardware, and an application program module 11052, including various application programs, and configured to implement various application services.

The application program module 11052 includes, but is not limited to, at least one unit of the obtaining unit 910 and the estimating unit 920 in the structure shown in FIG. 9.

In some other possible scenarios, assuming that the management node 1100 has a virtualization architecture, the memory 1105 may store a host and at least one virtual machine, where at least one unit of the obtaining unit 910 and the estimating unit 920 may be deployed in the host or virtual machine.

In this embodiment of the present disclosure, by invoking a program or an instruction stored in the memory 1105, the processor 1101 is configured to obtain a traffic parameter set, where the virtual machine pair includes a virtual machine vm-x1 and a virtual machine vm-y1; and estimate, based on the traffic parameter set, a rate of traffic sent by the virtual machine vm-x to the virtual machine vm-y1.

The virtual machine vm-x1 is deployed in a physical host pm-x, and the virtual machine vm-y1 is deployed in a physical host pm-y; N1 physical hosts including the physical host pm-x and the physical host pm-y are connected to N5 switching devices, and the N5 switching devices are parent nodes of the N1 physical hosts (for example, the N5 switching devices are some or all parent nodes of the N1 physical hosts, for example, the N1 physical hosts are some or all child nodes of the N5 switching devices). The N1 is an integer greater than 1, and the N2 is a positive integer.

The traffic parameter set includes rates of sending traffic of M21 virtual machines deployed in the physical host pm-x and including the virtual machine vm-x1 (for example, the M21 virtual machines are some or all virtual machines deployed in the physical host pm-x), rates of receiving traffic of M31 virtual machines deployed in the remaining physical hosts (the rest physical hosts include pm-y) of the N1 physical hosts except the physical host pm-x and including the virtual machine vm-y1 (for example, the M31 virtual machines are some or all virtual machines deployed in the remaining physical hosts of the N1 physical hosts except the physical host pm-x), rates of traffic sent by the N1 physical hosts including the physical host pm-y and the physical host pm-x to the N5 switching devices, and rates of outgoing traffic of the N5 switching devices, and the outgoing traffic of the N5 switching devices do not include traffic sent by the N5 switching devices to the N1 physical hosts. The N21, the N5, and the N31 are positive integers.

The physical host pm-x and the physical host pm-y may be any two physical hosts of the N1 physical hosts. The virtual machine vm-x1 is any virtual machine deployed in the physical host pm-x, and the virtual machine vm-y1 may be any virtual machine deployed in the physical host pm-y.

Specific manners of estimating, based on the traffic parameter set, a rate of traffic sent by the virtual machine vm-x1 to the virtual machine vm-y1 may be various, and some possible implementation manners are described as follows For example, the processor 1101 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

For another example, the processor 1101 may be configured to estimate, based on the traffic parameter set and by using the following formula, the rate of traffic sent by the virtual machine vm-x1 to the virtual machine vm-y1, $$T_{vm-x1 \to vm-y1} = \sum_{sw-xk \in Ln2} \left( \frac{T_{vm-y1}^{in}}{Q_{M31}^{in}} \times \right.$$
$$\left. \left( T_{vm-x1}^{out} - Q_{vm-x1-(pm-x)} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

where the $T_{vm-x1 \to vm-y1}$ indicates the rate of traffic sent by the virtual machine vm-x1 to the virtual machine vm-y1, the $T_{vm-y1}^{in}$ indicates a rate of receiving traffic of the virtual machine vm-y1, the $Q_{M31}^{in}$ indicates a sum of rates of receiving traffic of the M31 virtual machines, the $Q_{M21}^{out}$ indicates a sum of rates of sending traffic of the M21 virtual machines, the $T_{pm-x}^{out-(sw-xk)}$ indicates a rate of traffic sent by the physical host pm-x to a switching device sw-xk, the $Q_{N1}^{out-(sw-xk)}$ indicates a sum of rates of traffic sent by the N1 physical hosts to the switching device sw-xk, the $T_{sw-xk}^{out}$ indicates a rate of outgoing traffic of the switching device sw-xk, the Ln2 is a switching device set including the N3 switching devices, and the switching device sw-xk belongs to the Ln2.

The $Q_{vm-x1-(pm-x)}$ is a sum of rates of traffic sent by the virtual machine vm-x1 to virtual machines of the M21 virtual machines except the virtual machine vm-x1.

Optionally, the processor 1101 may be configured to estimate, based on the following formula, a rate $T_{vm-x1 \to vm-i}$ of traffic sent by the virtual machine vm-x1 to any virtual machine vm-i of the M21 virtual machines except the virtual machine vm-x1, where $$T_{vm-x1 \to vm-i} =$$
$$\left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right)$$

The $T_{vm-x1 \to vm-i}$ indicates a rate of traffic sent by the virtual machine vm-x1 to the virtual machine vm-i, the $T_{vm-i}^{out}$ indicates a rate of sending traffic of the virtual machine vm-i, the $T_{vm-x1}^{out}$ indicates a rate of sending traffic of the virtual machine vm-x1, and the $Q_{M21}^{out}$ indicates a sum of rates of sending traffic of the N21 virtual machines, where the $T_{vm-i}^{in}$ indicates a rate of receiving traffic of the virtual machine vm-i; the $T_{vm-i}^{in}$ indicates a rate of receiving traffic of the virtual machine vm-i; the $Q_{M21}^{in}$ indicates a sum of rates of receiving traffic of the M21 virtual machines, the $T_{pm-x}^{out}$ indicates rates of traffic sent by the physical host pm-x to the N5 switching devices, the $T_{pm-x}^{out}$ indicates rates of traffic received by the physical host pm-x from the N5 switching devices, and the virtual machine vm-i is any virtual machine of the M21 virtual machines except the virtual machine vm-x1.

Each rate mentioned in this embodiment may refer to an instantaneous rate at a same moment, and may also refer to an average rate in a same period of time.

It can be understood that, the foregoing exemplary specific manners of estimating, based on the traffic parameter set, a rate of traffic sent by the virtual machine vm-x1 to the virtual machine vm-y1 are only some possible implementation manners, and certainly other possible implementation manners further exist, and are not described herein in detail anymore one by one.

Further, after a traffic rate between virtual machines is estimated, the processor 1101 may migrate a pair of virtual machines with a large traffic rate into a same physical host, or migrate them into a physical host with a short path. Furthermore, a pair of virtual machines with a small traffic rate may be migrated into different physical hosts, for example, may be migrated into physical hosts with long paths. Certainly other policy control may be further performed based on the estimated traffic rate between the virtual machines.

It can be understood that, functions of functional modules of the management node 1100 (for example, a management node of a data center) of this embodiment may be implemented according to the method in the foregoing method embodiment, and for the specific implementation process thereof, reference may be made to the related description of the foregoing method embodiment, which is not described herein again.

The management node 1100 may be communicatively connected to the N1 physical hosts and/or the N5 switching devices, the management node 1100 may be a root node of a tree network to which the N5 switching devices belong or the management node 1100 may also be a lower-layer node of the root node of the tree network to which the N5 switching devices belong (where the management node 1100 may even be one of the N5 switching devices and the N1 physical hosts, for example, the management node 1100 may be a physical host or a switching device), and certainly, the management node 1100 may also be a device outside the tree network to which the N5 switching devices belong. The management node 1100 may, for example, send traffic rate reporting requests to nodes of the tree network to which the N5 switching devices such as the N5 switching devices and the N1 physical hosts belong, so as to online obtain a related traffic rate that the node of the tree network to which the N5 switching devices such as the N5 switching devices and the N1 physical hosts belong requests to feed back based on the traffic rate reporting request (for example, the management node 1100 may send the traffic rate reporting request to the physical host pm-x, the physical host pm-x may, for example, feed back a related traffic rate, such as a rate of traffic sent by the physical host pm-x to a parent node, or a rate of sending traffic of each virtual machine in the physical host pm-x, to the management node 1100 to respond to the traffic rate reporting request, similarly, the management node 1100 may send a traffic rate reporting request to a switching device of the N5 switching devices, the switching device may, for example, feed back a related traffic rate, such as a rate of traffic sent by the switching device to a parent node, to the management node 1100 to respond to the traffic rate reporting request, and the rest can be deduced by analogy). Furthermore, the management node 1100 may also be not communicatively connected to a node in the tree network to which the N5 switching devices such as the N1 physical hosts and the N5 switching devices belong, and therefore the management node 1100 may also offline obtain a related traffic rate of the node of the tree network to which the N5 switching devices such as the N1 physical hosts and the N5 switching devices belong.

It can be seen that, in the solution of this embodiment, when a rate of traffic sent by the virtual machine vm-x1 to the virtual machine vm-y1 is estimated by the management node 1100, reference is made to at least rates of sending traffic of the M21 virtual machines deployed in the physical host pm-x and including the virtual machine vm-x1, rates of receiving traffic of the M31 virtual machines deployed in the remaining physical hosts of the N1 physical hosts except the physical host pm-x and including the virtual machine vm-y1, rates of traffic sent by the N1 physical hosts including the physical host pm-y and the physical host pm-x to the N5 switching devices, and rates of outgoing traffic of the N5 switching devices. The N4 switching devices are parent nodes of the N1 physical hosts, and because reference is not only made to rates of traffic of the virtual machine vm-x1 and the virtual machine vm-y1, but also reference is made to a traffic rate of an upper-layer switching device related thereto, thereby facilitating accurate estimation of a traffic rate between a virtual machine pair. For example, compared with reference to only rates of traffic of the virtual machine vm-x1 and the virtual machine vm-y1, in the foregoing solution of the present disclosure, reference is made to more types of traffic rates with high correlations, thereby facilitating more accurate estimation of a traffic rate between a virtual machine pair.

An embodiment of the present disclosure further provides a computer storage medium, where the computer storage medium may store a program, and when being executed, the program includes some or all steps of any method for estimating a traffic rate between a virtual machine pair recorded in the method embodiments.

It should be noted that, for brief description, the foregoing method embodiments are represented as a series of actions. However, a person skilled in the art should appreciate that the present disclosure is not limited to the described order of the actions, and because according to the present disclosure, some steps may be performed in other orders or simultaneously. In addition, a person skilled in the art should also understand that the embodiments described in this specification all belong to exemplary embodiments, and the involved actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in the present application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may be not physically separate, and parts displayed as units may or may be not physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes any medium that can store program code, such as a universal serial bus (USB) flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail With reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for migrating a virtual machine through estimating a rate of traffic between a first virtual machine (vm-x1) and a second virtual machine (vm-y1), wherein the method comprises:
obtaining a traffic parameter set, wherein the traffic parameter set comprises:
rates of sending traffic from a plurality of N21 virtual machines deployed in a plurality of N2 physical hosts, wherein the N2 physical hosts comprise a first physical host (pm-x) and a second physical host (pm-y), wherein the vm-x1 is deployed in the pm-x and the vm-y1 is deployed in the pm-y, wherein N2 and N21 are positive integers;

rates of sending traffic from a plurality of N1 switching devices to a plurality of N4 switching devices, wherein the N1 switching devices comprise a first switching device (sw-x1) and a second switching device (sw-x2), wherein the sw-x1 and the sw-x2 are coupled to the N4 switching devices, wherein the N4 switching devices are parent nodes of the N1 switching devices, wherein the N2 physical hosts comprising the pm-x are nodes of the sw-x1, wherein N1 is an integer greater than 1, and wherein N4 is a positive integer;

rates of receiving traffic from a plurality of N31 virtual machines deployed in a plurality of N3 physical hosts, wherein the N3 physical hosts comprise the vm-y1, and wherein the N3 physical hosts comprising the pm-y are nodes of the remaining switching devices of the N1 switching devices, wherein N3 and N31 are positive integers; and rates of outgoing traffic of the N4 switching devices, wherein the outgoing traffic of the N4 switching devices excludes traffic from the N4 switching devices to the N1 switching devices;

estimating a rate of sending traffic from the vm-x1 to the vm-y1 based on the traffic parameter set; and migrating at least one of the vm-x1 and the vm-y1 from the pm-x or the pm-y to a different physical host based on the rate of sending traffic from the vm-x1 to the vm-y1.

2. The method of claim 1, wherein the estimating comprises estimating the rate of traffic from the vm-x1 to the vm-y1 based on the following formula:

$$T_{vm-x1 \to vm-y1} = \sum_{sw-xk \in Ln1} \left( \frac{T_{vm-y1}^{in}}{Q_{N31}^{in}} \times \left( T_{vm-x1}^{out} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

wherein $T_{vm-x1 \to vm-y1}$ indicates the rate of traffic from the vm-x1 to the vm-y1, wherein $T_{vm-y1}^{in}$ indicates a rate of receiving traffic of the vm-y1, wherein $Q_{N31}^{in}$ indicates a sum of rates of receiving traffic of the N31 virtual machines, wherein $Q_{N21}^{out}$ indicates a sum of rates of sending traffic of the N21 virtual machines, wherein $T_{vm-x1}^{out}$ indicates a rate of sending traffic of the vm-x1, wherein $T_{sw-x1}^{out-(sw-xk)}$ indicates a rate of traffic from the sw-x1 to a switching device (sw-xk), wherein $Q_{N1}^{out-(sw-xk)}$ indicates a sum of rates of traffic from the N1 switching devices to the sw-xk, wherein $T_{sw-xk}^{out}$ indicates a rate of outgoing traffic of the sw-xk, wherein Ln1 is a switching device set comprising the N4 switching devices, and wherein the sw-xk belongs to the Ln1.

3. The method of claim 1, wherein the traffic parameter set further comprises a corrected traffic parameter ($K_{vm-x1}$) that corresponds to the vm-x1, wherein $K_{vm-x1}$ is based on $Q_{vm-x1-(pm-x)}$, wherein the method further comprises deploying a plurality of N211 virtual machines in the pm-x, wherein $Q_{vm-x1-(pm-x)}$ is a sum of rates of traffic from the vm-x1 to the N211 virtual machines, and wherein the N211 virtual machines are a subset of the N21 virtual machines.

4. The method of claim 3, further comprising estimating a rate of traffic from the vm-x1 to any virtual machine (vm-i) of the N211 virtual machines based on the following formula:

$$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times \left( T_{vm-i}^{in} - \left( \frac{T_{vm-i}^{in}}{Q_{N211}^{in}} \times T_{pm-x}^{in} \right) \right),$$

wherein $T_{vm-x1 \to vm-i}$ indicates a rate of traffic from the vm-x1 to the vm-i of the N211 virtual machines, wherein $T_{vm-i}^{out}$ indicates a rate of sending traffic of the vm-i, wherein $T_{vm-x1}^{out}$ indicates a rate of sending traffic of the vm-x1, wherein $Q_{N211}^{out}$ indicates a sum of rates of sending traffic of the N211 virtual machines, wherein $T_{vm-i}^{in}$ indicates a rate of receiving traffic of the vm-i, wherein $Q_{N211}^{in}$ indicates a sum of rates of receiving traffic of the N211 virtual machines, wherein $T_{pm-x}^{out}$ indicates a rate of traffic from the pm-x to a parent node of the pm-x, wherein $T_{pm-x}^{in}$ indicates a rate of traffic received by the pm-x from the parent node of the pm-x, and wherein the vm-i is any virtual machine of the N211 virtual machines.

5. The method of claim 3, wherein $K_{vm-x1}$ is equal to a sum of the $Q_{vm-x1-(pm-x)}$ and $Q_{vm-x1-(sw-x3)}$, wherein $Q_{vm-x1-(sw-x3)}$ is a sum of rates of traffic from the vm-x1 to N2121 virtual machines, wherein a plurality of N212 physical hosts comprising the pm-x are coupled to a third switching device (sw-x3), wherein the N2121 virtual machines are deployed in physical hosts of the N212 physical hosts, wherein the N212 physical hosts are a subset of the N2 physical hosts, wherein the N2121 virtual machines are a subset of the N21 virtual machines, wherein the sw-x3 is a parent node of the N212 physical hosts, wherein the sw-x3 is a node of the sw-x1, wherein the N212 is a positive integer greater than 1 and N2121 is a positive integer, wherein $$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right),$$

wherein $T_{vm-x1 \to vm-j}$ indicates a rate of traffic from the vm-x1 to a virtual machine (vm-j), wherein $T_{vm-j}^{in}$ indicates a rate of receiving traffic of the vm-j, wherein $Q_{N2121}^{in}$ indicates a sum of rates of receiving traffic of the N2121 virtual machines, wherein $T_{vm-x1}^{out}$ indicates a rate of sending traffic of the vm-x1, wherein $T_{pm-x}^{out-(sw-x3)}$ indicates a rate of traffic from the pm-x to the sw-x3, wherein $Q_{N212}^{out-(sw-x3)}$ indicates a sum of rates of traffic from the N212 physical hosts to the sw-x3, wherein $T_{sw-x3}^{out}$ indicates a rate of outgoing traffic of the sw-x3, wherein a physical host (pm-xj) is any physical host of the N212 physical hosts, wherein the vm-j is any virtual machine deployed in the pm-xj, and wherein the outgoing traffic of the sw-x3 excludes traffic from the sw-x3 to the N212 physical hosts.

6. The method of claim 3, wherein $K_{vm-x1}$ is equal to a sum of the $Q_{vm-x1-(pm-x)}$ and $Q_{vm-x1-(sw-x3)}$, wherein $Q_{vm-x1-(sw-x3)}$ is a sum of rates of traffic from the vm-x1 to N2121 virtual machines, wherein N212 physical hosts comprising the pm-x are coupled to a third switching device (sw-x3), wherein the N2121 virtual machines are deployed in physical hosts of the N212 physical hosts, wherein the N212 physical hosts are a subset of the N2 physical hosts, wherein the N2121 virtual machines are a subset of the N21 virtual machines, wherein the sw-x3 is a parent node of the N212 physical hosts, wherein the sw-x3 is a node of the sw-x1, wherein N212 is a positive integer greater than 1 and N2121 is a positive integer, wherein $$T_{vm-x1 \to vm-j} = \frac{T^{in}_{vm-j}}{Q^{in}_{N2121}} \times \left( T^{out}_{vm-x1} - Q_{vm-x1-(pm-x)} - \left( \frac{T^{out}_{vm-x1}}{Q^{out}_{N211}} \times \frac{T^{out-(sw-x3)}_{pm-x}}{Q^{out-(sw-x3)}_{N212}} \times T^{out}_{sw-x3} \right) \right),$$

wherein $T_{vm-x1 \to vm-j}$ indicates a rate of traffic from the vm-x1 to a virtual machine (vm-j), wherein $T^{in}_{vm-j}$ indicates a rate of receiving traffic of the vm-j, wherein $Q^{in}_{N2121}$ indicates a sum of rates of receiving traffic of the N2121 virtual machines, wherein $T^{out}_{vm-x1}$ indicates a rate of sending traffic of the vm-x1, wherein $T^{out-(sw-x3)}_{pm-x}$ indicates a rate of traffic from the pm-x to the sw-x3, wherein $T^{out-(sw-x3)}_{N212}$ indicates a sum of rates of traffic from the N212 physical hosts to the sw-x3, wherein $T^{out}_{sw-x3}$ indicates a rate of outgoing traffic of the sw-x3, wherein a physical host (pm-xj) is any physical host of the N212 physical hosts, wherein the vm-j is any virtual machine deployed in the pm-xj, and wherein the outgoing traffic of the sw-x3 excludes traffic from the sw-x3 to the N212 physical hosts.

7. The method of claim 3, wherein estimating the rate of traffic from the vm-x1 to the vm-y1 comprises estimating the rate of traffic from the vm-x1 to the vm-y1 using the following formula:

$$T_{vm-x1 \to vm-y1} = \sum_{sw-xk \in Ln1} \left( \frac{T^{in}_{vm-y1}}{Q^{in}_{N31}} \times \left( T^{out}_{vm-x1} - K_{vm-x1} - \frac{T^{out}_{vm-x1}}{Q^{out}_{N21}} \times \frac{T^{out-(sw-xk)}_{sw-x1}}{Q^{out-(sw-xk)}_{N1}} \times T^{out}_{sw-xk} \right) \right),$$

wherein $T_{vm-x1 \to vm-y1}$ indicates a traffic rate from the vm-x1 to the vm-y1, wherein $T^{in}_{vm-y1}$ indicates a rate of receiving traffic of the vm-y1, wherein $Q^{in}_{N31}$ indicates a sum of rates of receiving traffic of the N31 virtual machines, wherein $T^{out}_{vm-x1}$ indicates a rate of sending traffic of the vm-x1, wherein $T^{out-(sw-xk)}_{sw-x1}$ indicates a rate of traffic from the sw-x1 to a switching device (sw-xk), wherein $Q^{out-(sw-xk)}_{N1}$ indicates a sum of rates of traffic from the N1 switching devices to the sw-xk, wherein $T^{out}_{sw-xk}$ indicates a rate of outgoing traffic of the sw-xk, wherein Ln1 is a switching device set comprising the N4 switching devices, and wherein the sw-xk belongs to the Ln1.

8. A method for migrating a virtual machine through estimating a rate of traffic between a virtual machine pair comprising a first virtual machine (vm-x1) and a second virtual machine (vm-y1), wherein the method comprises:
  obtaining a traffic parameter set, wherein the traffic parameter set comprises:
    rates of sending traffic from a plurality of M21 virtual machines deployed in a first physical host (pm-x), wherein the vm-x1 is deployed in the pm-x, wherein a plurality of N1 physical hosts comprise the pm-x, wherein M21 is a positive integer;
    rates of receiving traffic from a plurality of M31 virtual machines deployed in a remaining number of physical hosts of the N1 physical hosts, wherein the N1 physical hosts comprise the vm-y1, wherein the vm-y1 is deployed in a second physical host (pm-y) of the N1 physical hosts, wherein the N1 physical hosts comprising the pm-x and the pm-y are coupled to a plurality of N5 switching devices, wherein the N5 switching devices are parent nodes of the N1 physical hosts, wherein N1 is an integer greater than 1, and wherein M21, N5, and M31 are positive integers;
    rates of traffic from the N1 physical hosts comprising the pm-y and the pm-x to the N5 switching devices; and
    rates of outgoing traffic from the N5 switching devices, wherein the outgoing traffic of the N5 switching devices excludes traffic from the N5 switching devices to the N1 physical hosts;
  estimating, based on the traffic parameter set, the rate of traffic from the vm-x1 to the vm-y1; and
  migrating at least one of the vm-x1 and the vm-y1 from the pm-x or the pm-y to a different physical host based on the rate of traffic from the vm-x1 to the vm-y1.

9. The method of claim 8, wherein the estimating comprises estimating the rate of traffic from the vm-x1 to the vm-y1 based on the following formula:

$$T_{vm-x1 \to vm-y1} = \sum_{sw-xk \in Ln2} \left( \frac{T^{in}_{vm-y1}}{Q^{in}_{M31}} \times \left( T^{out}_{vm-x1} - \frac{T^{out}_{vm-x1}}{Q^{out}_{M21}} \times \frac{T^{out-(sw-xk)}_{pm-x}}{Q^{out-(sw-xk)}_{N1}} \times T^{out}_{sw-xk} \right) \right),$$

wherein $T_{vm-x1 \to vm-y1}$ indicates the rate of traffic from the vm-x1 to the vm-y1, wherein $T^{in}_{vm-y1}$ indicates a rate of receiving traffic of the vm-y1, wherein $Q^{in}_{M31}$ indicates a sum of rates of receiving traffic of the M31 virtual machines, wherein $Q^{out}_{M21}$ indicates a sum of rates of sending traffic of the M21 virtual machines, wherein $T^{out-(sw-xk)}_{pm-x}$ indicates a rate of traffic from the pm-x to a switching device (sw-xk), wherein $Q^{out-(sw-xk)}_{N1}$ indicates a sum of rates of traffic from the N1 physical hosts to the sw-xk, wherein $T^{out}_{sw-xk}$ indicates a rate of outgoing traffic of the sw-xk, wherein Ln2 is a switching device set comprising the N3 switching devices, and wherein the sw-xk belongs to the Ln2.

10. The method of claim 8, wherein the estimating comprises estimating the rate of traffic from the vm-x1 to the vm-y1 based on the following formula:

$$T_{vm-x1 \to vm-y1} = \sum_{sw-xk \in Ln2} \left( \frac{T^{in}_{vm-y1}}{Q^{in}_{M31}} \times \right.$$
$$\left. \left( T^{out}_{vm-x1} - Q_{vm-x1-(pm-x)} - \frac{T^{out}_{vm-x1}}{Q^{out}_{M21}} \times \frac{T^{out-(sw-xk)}_{pm-x}}{Q^{out-(sw-xk)}_{N1}} \times T^{out}_{sw-xk} \right) \right),$$

wherein $T_{vm-x1 \to vm-y1}$ indicates the rate of traffic from the vm-x1 to the vm-y1, wherein $T^{in}_{vm-y1}$ indicates a rate of receiving traffic of the vm-y1, wherein $Q^{in}_{M31}$ indicates a sum of rates of receiving traffic of the M31 virtual machines, wherein $Q^{out}_{M21}$ indicates a sum of rates of sending traffic of the M21 virtual machines, wherein $T^{out-(sw-xk)}_{pm-x}$ indicates a rate of traffic from the pm-x to a switching device (sw-xk), wherein $Q^{out-(sw-xk)}_{N1}$ indicates a sum of rates of traffic from the N1 physical hosts to the sw-xk, wherein $T^{out}_{sw-xk}$ indicates a rate of outgoing traffic of the sw-xk, wherein Ln2 is a switching device set comprising the N3 switching devices, wherein the sw-xk belongs to the Ln2, and wherein the $Q_{vm-x1-(pm-x)}$ is a sum of rates of traffic from the vm-x1 to the M21 virtual machines.

11. The method of claim 10, wherein the method further comprises estimating a rate ($T_{vm-x1 \to vm-i}$) of traffic from the vm-x1 to any virtual machine (vm-i) of the M21 virtual machines based on the following formula:

$$T_{vm-x1 \to vm-i} = \left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times \left( T_{vm-i}^{in} - \left( \frac{T_{vm-i}^{in}}{Q_{M21}^{in}} \times T_{pm-x}^{in} \right) \right),$$

wherein $T_{vm-x1 \to vm-i}$ indicates a rate of traffic from the vm-x1 to the vm-i, wherein $T_{vm-i}^{out}$ indicates a rate of sending traffic of the vm-i, wherein $T_{vm-x1}^{out}$ indicates a rate of sending traffic of the vm-x1, wherein $Q_{M21}^{out}$ indicates a sum of rates of sending traffic of the M21 virtual machines, wherein $T_{vm-i}^{in}$ indicates a rate of receiving traffic of the vm-i, wherein $T_{vm-i}^{in}$ indicates a rate of receiving traffic of the vm-i, wherein $Q_{M21}^{in}$ indicates a sum of rates of receiving traffic of the M21 virtual machines, wherein $T_{pm-x}^{out}$ indicates rates of traffic from the pm-x to the N5 switching devices, wherein $T_{pm-x}^{in}$ indicates rates of traffic received by the pm-x from the N5 switching devices, and wherein the vm-i is any virtual machine of the M21 virtual machines.

12. An apparatus for estimating a rate of traffic between a first virtual machine (vm-x1) and a second virtual machine (vm-y1), wherein the apparatus comprises:

a memory comprising instructions; and a processor coupled to the memory, wherein the instructions cause the processor to be configured to:

obtain a traffic parameter set, wherein the traffic parameter set comprises:

rates of sending traffic from a plurality of N21 virtual machines deployed in a plurality of N2 physical hosts, wherein the N2 physical hosts comprise a first physical host (pm-x), wherein the vm-x1 is deployed in the pm-x, wherein N2 and N21 are positive integers;

rates of traffic from a plurality of N1 switching devices to a plurality of N4 switching devices, wherein the N1 switching devices comprise a first switching device (sw-x1) and a second switching device (sw-x2), wherein the sw-x1 and the sw-x2 are coupled to the N4 switching devices, wherein the N2 physical hosts comprising the pm-x are nodes of the sw-x1, wherein N1 is an integer greater than 1, and wherein N4 is a positive integer;

rates of receiving traffic of a plurality of N31 virtual machines deployed in a plurality of N3 physical hosts, wherein the N3 physical hosts comprise the vm-y1, wherein the vm-y1 is deployed in a second physical host (pm-y) of the N3 physical hosts, wherein the N3 physical hosts are nodes of the remaining switching devices of the N1 switching devices, wherein N3 and N31 are positive integers; and rates of outgoing traffic from the N4 switching devices, wherein the outgoing traffic of the N4 switching devices excludes traffic from the N4 switching devices to the N1 switching devices; and migrate at least one of the vm-x1 and the vm-y1 from the pm-x or the pm-y to a different physical host based on the rate of traffic from the vm-x1 to the vm-y1.

13. The apparatus of claim 12, wherein the traffic parameter set further comprises a corrected traffic parameter ($K_{vm-x1}$) that corresponds to the vm-x1, wherein $K_{vm-x1}$ is equal to $Q_{vm-x1-(pm-x)}$, wherein the instructions further cause the processor to be configured to deploy a plurality of N211 virtual machines in the pm-x, wherein $Q_{vm-x1-(pm-x)}$ is a sum of rates of traffic from the vm-x1 to the N211 virtual machines, and wherein the N211 virtual machines are a subset of the N21 virtual machines.

14. The apparatus of claim 13, wherein the processor is further configured to estimate a rate $T_{vm-x1 \to vm-i}$ of traffic from the vm-x1 to any virtual machine (vm-i) of the N211 virtual machines based on the following formula:

$$T_{vm-x1 \to vm-i} = \left( \frac{T_{vm-x1}^{out} - \left( \frac{T_{vm-x1}^{out}}{Q_{N211}^{out}} \times T_{pm-x}^{out} \right)}{\left( T_{vm-x1}^{out} - \left( \frac{T_{vm-x1}^{out}}{Q_{N211}^{out}} \times T_{pm-x}^{out} \right) \right) + \left( T_{vm-i}^{out} - \left( \frac{T_{vm-i}^{out}}{Q_{N211}^{out}} \times T_{pm-x}^{out} \right) \right)} \right) \times \left( T_{vm-i}^{in} - \left( \frac{T_{vm-i}^{in}}{Q_{N211}^{in}} \times T_{pm-x}^{in} \right) \right),$$

wherein $T_{vm-x1 \to vm-i}$ indicates a rate of traffic from the vm-x1 to the vm-i of the N211 virtual machines, wherein $T_{vm-i}^{out}$ indicates a rate of sending traffic of the vm-i, wherein $T_{vm-x1}^{out}$ indicates a rate of sending traffic of the vm-x1, wherein $Q_{N211}^{out}$ indicates a sum of rates of sending traffic of the N211 virtual machines, wherein $T_{vm-i}^{in}$ indicates a rate of receiving traffic of the vm-i, wherein $Q_{N211}^{in}$ indicates a sum of rates of receiving traffic of the N211 virtual machines, wherein $T_{pm-x}^{out}$ indicates a rate of traffic from the pm-x to a parent node of the pm-x, wherein $T_{pm-x}^{in}$ indicates a rate of traffic received by the pm-x from a parent node of the pm-x, and wherein the vm-i is any virtual machine of the N211 virtual machines.

15. The apparatus of claim 13, wherein $K_{vm-x1}$ is equal to a sum of the $Q_{vm-x1-(pm-x)}$ and $Q_{vm-x1-(sw-x3)}$, wherein $Q_{vm-x1-(sw-s3)}$ is a sum of rates of traffic from the vm-x1 to a plurality of N2121 virtual machines, wherein a switching device (sw-x3) is coupled to a plurality of N212 physical hosts, wherein the N2121 virtual machines are deployed in physical hosts of the N212 physical hosts, wherein the N212 physical hosts are a subset of the N2 physical hosts, wherein the N2121 virtual machines are a subset of the N21 virtual machines, wherein the sw-x3 is a parent node of the N212 physical hosts, wherein the sw-x3 is a node of the sw-x1, wherein N212 is a positive integer greater than 1, wherein N2121 is a positive integer, and wherein a rate of traffic from the vm-x1 to a virtual machine (vm-j) is given by one of the following equations:

$$T_{vm-x1 \to vm-j} = \frac{T_{vm-j}^{in}}{Q_{N2121}^{in}} \times \left( T_{vm-x1}^{out} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right); \text{ or}$$

$$T_{vm-x1 \to vm-j} = \frac{T_{vm-j}^{in}}{Q_{N2121}^{in}} \times \left( T_{vm-x1}^{out} - Q_{vm-x1-(pm-x)} - \left( \frac{T_{vm-x1}^{out}}{Q_{N211}^{out}} \times \frac{T_{pm-x}^{out-(sw-x3)}}{Q_{N212}^{out-(sw-x3)}} \times T_{sw-x3}^{out} \right) \right),$$

wherein $T_{vm-j}^{in}$ indicates a rate of receiving traffic of the vm-j, wherein $Q_{N2121}^{in}$ indicates a sum of rates of receiving traffic of the N2121 virtual machines, wherein $T_{vm-x1}^{out}$ indicates a rate of sending traffic of the vm-x1, wherein $T_{pm-x}^{out-(sw-x3)}$ indicates a rate of traffic from the pm-x to the sw-x3, wherein $Q_{N212}^{out-(sw-x3)}$ indicates a sum of rates of traffic from the N212 physical hosts to the sw-x3, wherein $T_{sw-x3}^{out}$ indicates a rate of outgoing traffic of the sw-x3, wherein a physical host (pm-xj) is any physical host of the N212 physical hosts, wherein the vm-j is any virtual machine deployed in the pm-xj, and wherein the outgoing traffic of the sw-x3 excludes traffic from the sw-x3 to the N212 physical hosts.

16. The apparatus of claim 13, wherein the processor is further configured to estimate the rate of traffic from the vm-x1 to the vm-y1 based on each of the traffic parameter set and using the following formula:

$$T_{vm-x1 \to vm-y1} = \sum_{sw-xk \in Ln1} \left( \frac{T_{vm-y1}^{in}}{Q_{N31}^{in}} \times \left( T_{vm-x1}^{out} - K_{vm-x1} - \frac{T_{vm-x1}^{out}}{Q_{N21}^{out}} \times \frac{T_{sw-x1}^{out-(sw-xk)}}{Q_{N1}^{out-(sw-xk)}} \times T_{sw-xk}^{out} \right) \right),$$

wherein $T_{vm-x1 \to vm-y1}$ indicates a traffic rate from the vm-x1 to the vm-y1, wherein $T_{vm-y1}^{in}$ indicates a rate of receiving traffic of the vm-y1, wherein $Q_{N31}^{in}$ indicates a sum of rates of receiving traffic of the N31 virtual machines, wherein $T_{vm-x1}^{out}$ indicates a rate of sending traffic of the vm-x1, wherein $T_{sw-x1}^{out-(sw-xk)}$ indicates a rate of traffic from the sw-x1 to a switching device (sw-xk), wherein $Q_{N1}^{out-(sw-xk)}$ indicates a sum of rates of traffic from the N1 switching devices to the sw-xk, wherein $T_{sw-xk}^{out}$ indicates a rate of outgoing traffic of the sw-xk, wherein Ln1 is a switching device set comprising the N4 switching devices, and wherein the sw-xk belongs to the Ln1.

17. An apparatus for estimating a rate of traffic between a first virtual machine (vm-x1) and a second virtual machine (vm-x2), wherein the apparatus comprises:
a memory comprising instructions; and
a processor coupled to the memory, wherein the instructions cause the processor to be configured to:
obtain a traffic parameter set, wherein the traffic parameter set comprises:
rates of sending traffic of a plurality of M21 virtual machines deployed in a first physical host (pm-x), wherein a plurality of N1 physical hosts comprise the pm-x and a second physical host (pm-y), wherein the pm-x comprises the vm-x1, wherein N1 is an integer greater than 1, and wherein M21 is a positive integer;
rates of receiving traffic from a plurality of M31 virtual machines deployed in the remaining physical hosts of the N1 physical hosts, wherein the N1 physical hosts comprises the vm-y1, wherein the vm-y1 is deployed in the pm-y, wherein M31 is a positive integer;
rates of traffic from the N1 physical hosts comprising the pm-y and the pm-x to a plurality of N5 switching devices, wherein the N1 physical hosts comprising the pm-x and the pm-y are coupled to the N5 switching devices, wherein the N5 switching devices are parent nodes of the N1 physical hosts, wherein N5 is a positive integer; and
rates of outgoing traffic from the N5 switching devices, wherein the outgoing traffic of the N5 switching devices excludes traffic from the N5 switching devices to the N1 physical hosts; and
estimate, based on the traffic parameter set, the rate of traffic from the vm-x1 to the vm-y1 by estimating the rate of traffic from the vm-x1 to the vm-y1 based on the traffic parameter set and using a formula; and
migrate at least one of the vm-x1 and the vm-y1 from the pm-x or the pm-y to a different physical host based on the rate of traffic from the vm-x1 to the vm-y1.

18. The apparatus of claim 17, wherein the instructions further cause the processor to be configured to estimate, based on the traffic parameter set, the rate of traffic from the vm-x1 to the vm-y1 based on the following formula:

$$T_{vm-x1 \to vm-y1} = \sum_{sw-xk \in Ln2} \left( \frac{T_{vm-y1}^{in}}{Q_{M31}^{in}} \times \left( T_{vm-x1}^{out} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

wherein $T_{vm-x1 \to vm-y1}$ indicates the rate of traffic from the vm-x1 to the vm-y1, wherein $T_{vm-y1}^{in}$ indicates a rate of receiving traffic of the vm-y1, wherein $Q_{M31}^{in}$ indicates a sum of rates of receiving traffic of the M31 virtual machines, wherein $Q_{M21}^{out}$ indicates a sum of rates of sending traffic of the M21 virtual machines, where in $T_{pm-x}^{out-(sw-xk)}$ indicates a rate of traffic from the pm-x to a switching device (sw-xk), wherein $Q_{N1}^{out-(sw-xk)}$ indicates a sum of rates of traffic from the N1 physical hosts to the sw-xk, wherein $T_{sw-xk}^{out}$ indicates a rate of outgoing traffic of the sw-xk, wherein Ln2 is a switching device set comprising the N3 switching devices, and wherein the sw-xk belongs to the Ln2.

19. The apparatus of claim 17, wherein the instructions further cause the processor to be configured to estimate, based on the traffic parameter set, the rate of traffic from the vm-x1 to the vm-y1 based on the following formula:

$$T_{vm-x1 \to vm-y1} = \sum_{sw-xk \in Ln2} \left( \frac{T_{vm-y1}^{in}}{Q_{M31}^{in}} \times \left( T_{vm-x1}^{out} - Q_{vm-x1-(pm-x)} - \frac{T_{vm-x1}^{out}}{Q_{M21}^{out}} \times \frac{T_{pm-x}^{out-(sw-xk)}}{Q_{N1}^{out-(sw-xk)}} \times T_{sw-xk}^{out} \right) \right),$$

wherein $T_{vm-x1 \to vm-y1}$ indicates the rate of traffic from the vm-x1 to the vm-y1, wherein $T_{vm-y1}^{in}$ indicates a rate of receiving traffic of the vm-y1, wherein $Q_{M31}^{in}$ indicates a sum of rates of receiving traffic of the M31 virtual machines, wherein $Q_{M21}^{out}$ indicates a sum of rates of sending traffic of the M21 virtual machines, wherein $T_{pm-x}^{out-(sw-xk)}$ indicates a rate of traffic from the pm-x to a switching device (sw-xk), wherein $Q_{N1}^{out-(sw-xk)}$ indicates a sum of rates of traffic from the N1 physical hosts to the sw-xk, wherein $T_{sw-xk}^{out}$ indicates a rate of outgoing traffic of the sw-xk, wherein Ln2 is a switching device set comprising the N3 switching devices, wherein the sw-xk belongs to the Ln2, and wherein the $Q_{vm-x1-(pm-x)}$ is a sum of rates of traffic from the vm-x1 to virtual machines of the M21 virtual machines.

20. The apparatus of claim 19, wherein the instructions further cause the processor to be configured to estimate the rate ($T_{vm-x1 \to vm-i}$) based on the following formula:

$$T_{vm-x1 \to vm-i} =$$

$$\left( \frac{T_{vm-x1}^{out} - \left( \frac{T_{vm-x1}^{out}}{Q_{M21}^{out}} \times T_{pm-x}^{out} \right)}{\left( T_{vm-x1}^{out} - \left( \frac{T_{vm-x1}^{out}}{Q_{M21}^{out}} \times T_{pm-x}^{out} \right) \right) + \left( T_{vm-i}^{out} - \left( \frac{T_{vm-i}^{out}}{Q_{M21}^{out}} \times T_{pm-x}^{out} \right) \right)} \right) \times$$

$$\left( T_{vm-i}^{in} - \left( \frac{T_{vm-i}^{in}}{Q_{M21}^{in}} \times T_{pm-x}^{in} \right) \right),$$

wherein $T_{vm-x1 \to vm-i}$ indicates a rate of traffic from the vm-x1 to the vm-i, wherein $T_{vm-i}^{out}$ indicates a rate of sending traffic of the vm-i, wherein $T_{vm-x1}^{out}$ indicates a rate of sending traffic of the vm-x1, wherein $Q_{M21}^{out}$ indicates a sum of rates of sending traffic of the M21 virtual machines, wherein $T_{vm-i}^{out}$ indicates a rate of receiving traffic of the vm-i, wherein $T_{vm-i}^{in}$ indicates a rate of receiving traffic of the vm-i, wherein $Q_{M21}^{in}$ indicates a sum of rates of receiving traffic of the M21 virtual machines, wherein $T_{pm-x}^{out}$ indicates rates of traffic from the pm-x to the N5 switching devices, wherein $T_{pm-x}^{in}$ indicates rates of traffic received by the pm-x from the N5 switching devices, and wherein the vm-i is any virtual machine of the M21 virtual machines.

\* \* \* \* \*

UNITED STATES PATENT AND TRADEMARK OFFICE
CERTIFICATE OF CORRECTION

PATENT NO. : 10,819,610 B2  
APPLICATION NO. : 16/413115  
DATED : October 27, 2020  
INVENTOR(S) : Jiaying He, Lili Liu and Fan Yu Page 1 of 1

It is certified that error appears in the above-identified patent and that said Letters Patent is hereby corrected as shown below:

In the Claims

Claim 6, Column 61, Line 18: "wherein $T_{N212}^{out-(sw-x3)}$" should read "wherein $Q_{N212}^{out-(sw-x3)}$"

Signed and Sealed this  
Eighth Day of December, 2020

Andrei Iancu  
*Director of the United States Patent and Trademark Office*